United States Patent
Ambai

(10) Patent No.: US 11,657,267 B2
(45) Date of Patent: May 23, 2023

(54) NEURAL NETWORK APPARATUS, VEHICLE CONTROL SYSTEM, DECOMPOSITION DEVICE, AND PROGRAM

(71) Applicant: Denso IT Laboratory, Inc., Tokyo (JP)

(72) Inventor: Mitsuru Ambai, Tokyo (JP)

(73) Assignee: DENSO IT LABORATORY, INC., Tokyo (JP)

( * ) Notice: Subject to any disclaimer, the term of this patent is extended or adjusted under 35 U.S.C. 154(b) by 1155 days.

(21) Appl. No.: 16/318,779

(22) PCT Filed: Jul. 20, 2017

(86) PCT No.: PCT/JP2017/026363
§ 371 (c)(1),
(2) Date: Jun. 6, 2019

(87) PCT Pub. No.: WO2018/016608
PCT Pub. Date: Jan. 25, 2018

(65) Prior Publication Data
US 2019/0286982 A1    Sep. 19, 2019

(30) Foreign Application Priority Data
Jul. 21, 2016  (JP) .............................. JP2016-143705

(51) Int. Cl.
*G06F 7/38* (2006.01)
*G06N 3/08* (2023.01)
(Continued)

(52) U.S. Cl.
CPC ............... *G06N 3/08* (2013.01); *G06F 17/16* (2013.01); *G06N 3/04* (2013.01); *G06N 3/045* (2023.01); *G06N 3/048* (2023.01); *G06N 3/063* (2013.01)

(58) Field of Classification Search
CPC .......... G06N 3/08; G06N 3/04; G06N 3/0454; G06N 3/0481; G06N 3/063; G06F 17/16
See application file for complete search history.

(56) References Cited

U.S. PATENT DOCUMENTS 5,600,843 A *  2/1997 Kato ................. G06F 15/17337
                                                                 700/8
8,457,409 B2 *  6/2013 Lo ........................ G06K 9/6296
                                                                 706/20
(Continued)

FOREIGN PATENT DOCUMENTS

JP    H05-101025 A    4/1993
JP    2016-042359 A   3/2016

OTHER PUBLICATIONS

Rastegari et al., "XNOR-Net: ImageNet Classification Using Binary Convolutional Neural Networks", v3, May 9, 2016, retrieval date Oct. 11, 2017, internet:<URL:https://arxiv.org/pdf/1603.05279v3.pdf>, chapter 3.2.

(Continued)

*Primary Examiner* — Cheng Yuan Tseng
(74) *Attorney, Agent, or Firm* — Pearne & Gordon LLP

(57) ABSTRACT

A neural network apparatus (20) includes a storage unit (24) storing a neural network model, and an arithmetic unit (22) inputting input information into an input layer of the neural network and outputting an output layer. A weight matrix (W) of an FC layer of the neural network model is constituted by a product of a weight basis matrix ($M_w$) of integers and a weight coefficient matrix ($C_w$) of real numbers. In the FC layer, the arithmetic unit (22) uses an output vector from a previous layer as an input vector (x) to decompose the input vector (x) into a product of a binary input basis matrix ($M_x$) and an input coefficient vector ($c_x$) of real numbers and an input bias ($b_x$) and derives a product of the input vector (x) and a weight matrix (W).

7 Claims, 28 Drawing Sheets

(51) Int. Cl.
    *G06F 17/16*       (2006.01)
    *G06N 3/04*        (2023.01)
    *G06N 3/063*      (2023.01)
    *G06N 3/045*      (2023.01)
    *G06N 3/048*      (2023.01)

(56) References Cited

U.S. PATENT DOCUMENTS

| | | | |
|---|---|---|---|
| 9,728,184 B2 * | 8/2017 | Xue | G06N 3/084 |
| 10,534,994 B1 * | 1/2020 | Kaul | G06N 3/0454 |
| 2021/0004686 A1 * | 1/2021 | Rozen | G10L 15/16 |

OTHER PUBLICATIONS

International Search Report for PCT/JP2017/026363 dated Oct. 24, 2017.

* cited by examiner

Fig. 17

| | | | | $c_x$ | | | |
|---|---|---|---|---|---|---|---|
| | | | | 3.8 | | | |
| | | | | 8.6 | | | |
| | | | | 1.2 | | $b_x$ | $(\beta c_x + b_x)$ |
| | | | | 0.4 | | | |
| -1 | -1 | -1 | -1 | | + 15.2 | = | 1.2 |
| -1 | -1 | -1 | 1 | | + 15.2 | = | 2 |
| -1 | -1 | 1 | -1 | | + 15.2 | = | 3.6 |
| -1 | -1 | 1 | 1 | | + 15.2 | = | 4.4 |
| -1 | 1 | -1 | -1 | | + 15.2 | = | 18.4 |
| -1 | 1 | -1 | 1 | | + 15.2 | = | 19.2 |
| -1 | 1 | 1 | -1 | | + 15.2 | = | 20.8 |
| -1 | 1 | 1 | 1 | | + 15.2 | = | 21.6 |
| 1 | -1 | -1 | -1 | | + 15.2 | = | 8.8 |
| 1 | -1 | -1 | 1 | | + 15.2 | = | 9.6 |
| 1 | -1 | 1 | -1 | | + 15.2 | = | 11.2 |
| 1 | -1 | 1 | 1 | | + 15.2 | = | 12 |
| 1 | 1 | -1 | -1 | | + 15.2 | = | 26 |
| 1 | 1 | -1 | 1 | | + 15.2 | = | 26.8 |
| 1 | 1 | 1 | -1 | | + 15.2 | = | 28.4 |
| 1 | 1 | 1 | 1 | | + 15.2 | = | 29.2 |

ALL COMBINATIONS OF $\beta$

Fig. 18

|  |  |  |  | $c_x$ |  |  |  |  |  |
|---|---|---|---|---|---|---|---|---|---|
|  |  |  |  | 3.8 |  |  |  |  |  |
|  |  |  |  | 8.6 |  |  |  |  |  |
|  |  |  |  | 1.2 |  | $b_x$ |  | $(\beta c_x + b_x)$ |  |
|  |  |  |  | 0.4 |  |  |  |  |  |
| $\beta_1=$ | -1 | -1 | -1 | -1 | + | 15.2 | = | 1.2 | $=p_1$ |
| $\beta_2=$ | -1 | -1 | -1 | 1 | + | 15.2 | = | 2 | $=p_2$ |
|  | -1 | -1 | 1 | -1 | + | 15.2 | = | 3.6 |  |
|  | -1 | -1 | 1 | 1 | + | 15.2 | = | 4.4 |  |
|  | 1 | -1 | -1 | -1 | + | 15.2 | = | 8.8 |  |
|  | 1 | -1 | -1 | 1 | + | 15.2 | = | 9.6 |  |
|  | 1 | -1 | 1 | -1 | + | 15.2 | = | 11.2 |  |
|  | 1 | -1 | 1 | 1 | + | 15.2 | = | 12 |  |
|  | -1 | 1 | -1 | -1 | + | 15.2 | = | 18.4 |  |
|  | -1 | 1 | -1 | 1 | + | 15.2 | = | 19.2 |  |
|  | -1 | 1 | 1 | -1 | + | 15.2 | = | 20.8 |  |
|  | -1 | 1 | 1 | 1 | + | 15.2 | = | 21.6 |  |
|  | 1 | 1 | -1 | -1 | + | 15.2 | = | 26 |  |
|  | 1 | 1 | -1 | 1 | + | 15.2 | = | 26.8 |  |
|  | 1 | 1 | 1 | -1 | + | 15.2 | = | 28.4 |  |
| $\beta_{16}=$ | 1 | 1 | 1 | 1 | + | 15.2 | = | 29.2 | $=p_{16}$ | nt-text-medium"># NEURAL NETWORK APPARATUS, VEHICLE CONTROL SYSTEM, DECOMPOSITION DEVICE, AND PROGRAM

RELATED APPLICATION

The present application claims priority to Japanese Patent Application No. 2016-143705, filed on Jul. 21, 2016, in Japan, the entire disclosure of which is hereby incorporated by reference herein.

TECHNICAL FIELD

The present technique relates to a neural network apparatus and a program inputting input information into an input layer of a neural network model and acquiring output information from an output layer, a vehicle control system including the neural network apparatus, and a decomposition device for building the neural network.

BACKGROUND ART

By processing input information with use of a neural network, the input information can be classified, and predetermined information can be detected from the input information. FIG. 16 illustrates an example of a neural network classifying a four-dimensional input vector into three classes (identifying to which of the three classes the input vector belongs). As illustrated in FIG. 16, when a four-dimensional input vector (referred to as an input map as well) to be identified is input as an input layer $a_0$, the input information passes through middle layers $a_1$ to $a_3$ and is output as a three-dimensional output layer $a_4$.

Between the input layer $a_0$ and the middle layer $a_1$, a weight matrix (referred to as filters as well) $W_1$ and a bias vector $b_1$ are defined, and the middle layer $a_1$ is derived by Formula (1) shown below.

[Equation 1]

$$a_1 = f(W_1^T a_0 + b_1) \quad (1)$$

In this equation, $f(\cdot)$ is an activating function, and the following function (ReLU) is used, for example.

[Equation 2]

$$f(z) = \begin{cases} 0 & \text{if } z < 0 \\ z & \text{otherwise} \end{cases}$$

In a similar manner, the middle layers $a_2$ and $a_3$ are derived by Formulae (2) and (3) shown below, and the output layer $a_4$ is derived by Formula (4) shown below.

[Equation 3]

$$a_2 = f(W_2^T a_1 + b_2) \quad (2)$$

$$a_3 = f(W_3^T a_2 + b_3) \quad (3)$$

$$a_4 = \text{softmax}(W_4^T a_3 + b_4) \quad (4)$$

In this manner, in each layer of the neural network, when an input vector from a previous layer is x ($D_I$ dimension), and a weight matrix W ($D_I$ rows and $D_O$ columns) and a bias b ($D_O$ dimension) are defined, an output vector (before applying the activating function) y ($D_O$ dimension) to a subsequent layer is expressed as Formula (5) shown below.

[Equation 4]

$$x \in \mathbb{R}^{D_I}$$

$$W \in \mathbb{R}^{D_I D_O}$$

$$b \in \mathbb{R}^{D_O}$$

$$y = W^T x + b \quad (5)$$

SUMMARY OF INVENTION

In the above neural network, it is known that increasing the number of layers (deepening the layer) causes information processing accuracy to be improved. However, when the number of layers is increased, processing cost also increases. Specifically, the memory amount required for operation of Formula (5) increases, and the processing time is extended.

For example, in a fully connected layer (hereinbelow referred to as "an FC layer"), in a case in which the weight matrix W is a single-precision real number (32 bits), the memory as much as 32 $D_I D_O$ bits is consumed. Also, in each layer, a product-sum operation of the single-precision real number is required $D_I D_O$ times, and this operation particularly requires processing time. Meanwhile, the FC layer is normally arranged at the end of the neural network. In a convolutional layer (hereinbelow referred to as "a CONV layer"), by appropriately cutting out an input map according to a sliding window and performing sorting, the CONV layer can be regarded as the FC layer.

The present technique is accomplished by taking such problems as mentioned above into consideration thereof, and an object thereof is to reduce the memory consumption amount and the operation amount in a neural network apparatus.

A neural network apparatus according to an aspect includes a storage unit (24) storing a neural network model, and an arithmetic unit (22) inputting input information into an input layer of the neural network model and outputting an output layer. A weight matrix (W) of at least one layer of the neural network model is constituted by a product ($M_w C_w$) of an integer matrix serving as a weight basis matrix ($M_w$) and a real number matrix serving as a weight coefficient matrix ($C_w$).

A neural network apparatus according to an aspect is a neural network apparatus performing recognition with use of a neural network model, and logical operation is conducted as operation of at least one layer of the neural network model.

A neural network apparatus according to an aspect is a neural network apparatus performing recognition with use of a neural network model, and a binary or ternary matrix for use in operation of at least one layer of the neural network model is stored.

A vehicle control system according to an aspect includes the aforementioned neural network apparatus (20), an in-vehicle sensor (30) acquiring the input information, and a vehicle control apparatus (40) controlling a vehicle based on the output.

A decomposition device according to an aspect includes an acquisition unit (11) acquiring a neural network model, a weight decomposition unit (12) decomposing a weight matrix of at least one layer of the neural network model into a product ($M_w C_w$) of an integer matrix serving as a weight basis matrix ($M_w$) and a real number matrix serving as a weight coefficient matrix ($C_w$), and an output unit (14) outputting the weight basis matrix ($M_w$) and the weight coefficient matrix ($C_w$).

A program according to an aspect is a program causing a computer to function as a neural network apparatus inputting input information into an input layer of a neural network model and acquiring output information from an output layer. A storage unit (24) of the computer has stored therein a weight basis matrix ($M_w$) of integers and a weight coefficient matrix ($C_w$) of real numbers acquired by decomposing a weight matrix (W) of at least one fully connected layer of the neural network model, an input coefficient vector ($c_x$) out of the input coefficient vector ($c_x$) and an input bias ($b_x$) acquired by learning for decomposing an input vector (x) into a sum of a product of an input basis matrix ($M_x$) of integers and the input coefficient vector ($c_x$) of real numbers and the input bias ($b_x$), and a lookup table (LUT) specifying a relationship between a value ($x_j$) of each of respective elements of the input vector and a value ($m_x^{(j)}$) of the input basis matrix for the value acquired based on the input coefficient vector ($c_x$) and the input bias ($b_x$) acquired by the learning. The program causes the computer to function as an arithmetic unit, in the at least one fully connected layer of the neural network model, using an output vector from a previous layer as the input vector (x) to derive a product of the input vector (x) and the weight matrix (W) with use of the weight basis matrix ($M_w$), the weight coefficient matrix ($C_w$) of real numbers, and the input coefficient vector ($c_x$) read from the storage unit (24) and the input basis matrix ($M_x$) corresponding to the input vector (x) acquired by looking up the lookup table (LUT) read from the storage unit (24).

A program according to an aspect is a program causing a computer to function as a neural network apparatus inputting input information into an input layer of a neural network model and acquiring output information from an output layer. A storage unit (24) of the computer has stored therein a weight basis matrix ($M_w$) of integers and a weight coefficient matrix ($C_w$) of real numbers acquired by decomposing a weight matrix (w) of at least one fully connected layer of the neural network model, an input coefficient vector ($c_x$) out of the input coefficient vector ($c_x$) and an input bias ($b_x$) acquired by learning for decomposing an input vector (x) into a sum of a product of an input basis matrix ($M_x$) of integers and the input coefficient vector ($c_x$) of real numbers and the input bias ($b_x$), and, for respective elements ($x_j$) of the input vector, all combinations (β) of rows of the input basis matrix corresponding to the respective elements ($x_j$) of the input vector and midpoints ($mp_i$) obtained when approximate candidates (p) of the respective elements ($x_j$) of the input vector acquired by the combination (β) are arranged according to size, acquired based on the input coefficient vector ($c_x$) and the input bias ($b_x$) acquired by the learning. The program causes the computer to function as an arithmetic unit (22), in the at least one fully connected layer of the neural network model, using an output vector from a previous layer as the input vector (x) to derive a product of the input vector and the weight matrix with use of the weight basis matrix ($M_w$), the weight coefficient matrix ($C_w$) of real numbers, and the input coefficient vector ($c_x$) read from the storage unit (24), and all the combinations (β) of the rows of the input basis matrix and the midpoints ($mp_i$).

A neural network apparatus according to an aspect includes a storage unit (24) storing a neural network model, and an arithmetic unit (22) inputting input information into an input layer of the neural network model and outputting an output layer. In at least one layer of the neural network model, the arithmetic unit (22) uses an output vector from a previous layer as an input vector (x) to decompose the input vector (x) into a sum of a product ($M_x c_x$) of an integer matrix serving as an input basis matrix ($M_x$) and a real number vector serving as an input coefficient vector ($c_x$) and an input bias ($b_x$) ($x = M_x c_x + b_x 1$) and derives a product of the input vector ($M_x c_x + b_x 1$) decomposed and a weight matrix (W) ($W^T x = W(M_x c_x + b_x 1)$)

As described below, the present technique has other aspects. Accordingly, disclosure of the present technique is intended to provide part of the present technique and is not intended to limit the scope of the invention described and claimed herein.

BRIEF DESCRIPTION OF DRAWINGS

FIG. 17 describes optimization of the basis matrix of the input vector according to a modification example of the embodiment.

FIG. 18 describes the optimization of the basis matrix of the input vector according to the modification example of the embodiment.

DESCRIPTION OF EMBODIMENTS

Figure 1:
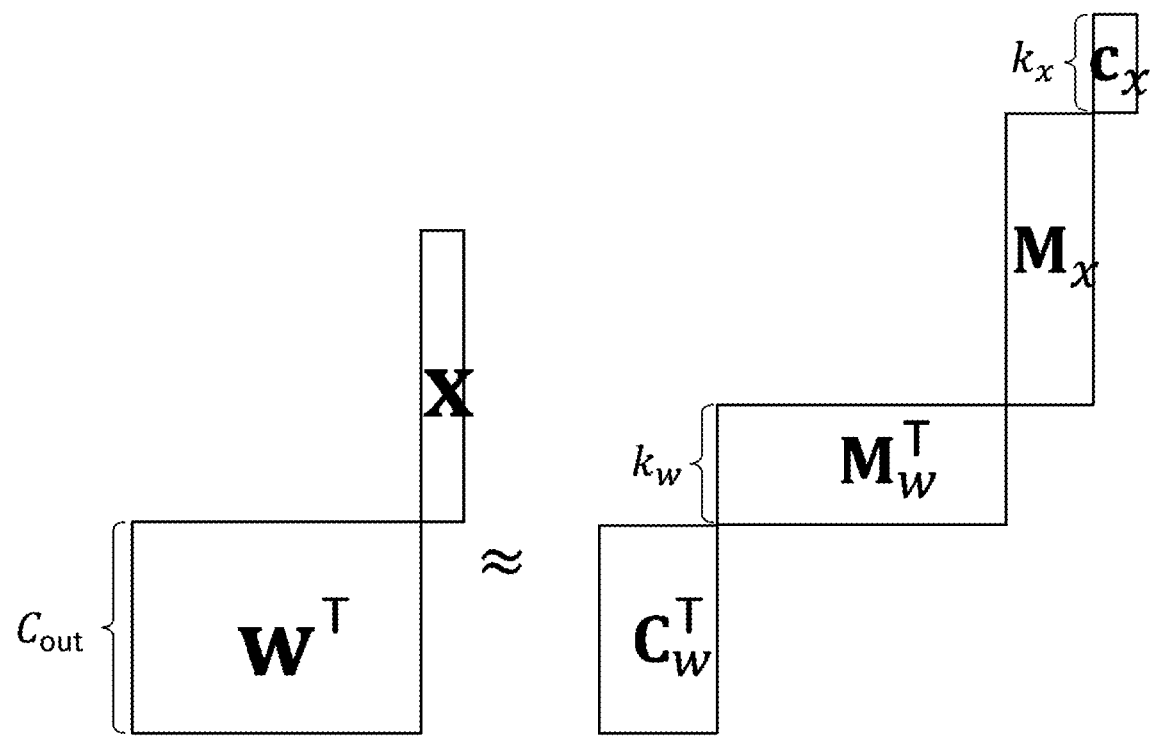
FIG. 1 describes calculation of an integer-decomposed product of an input vector and a weight matrix according to an embodiment.

Hereinbelow, embodiments will be described with reference to the drawings. It is to be noted that the embodiments described below are provided as examples of a case of carrying out the present technique and are not intended to limit the technique to the below-mentioned specific configurations. In carrying out the present technique, a specific configuration in accordance with an embodiment may arbitrarily be employed.

A neural network apparatus according to an aspect includes a storage unit (24) storing a neural network model, and an arithmetic unit (22) inputting input information into an input layer of the neural network model and outputting an output layer. A weight matrix (W) of at least one layer of the neural network model is constituted by a product ($M_w C_w$) of an integer matrix serving as a weight basis matrix ($M_w$) and a real number matrix serving as a weight coefficient matrix ($C_w$).

In this configuration, since the weight matrix (W) of a fully connected layer in the neural network is constituted by the product ($M_w C_w$) of the weight basis matrix ($M_w$) of integers and the weight coefficient matrix ($C_w$) of real numbers, the memory consumption amount can be reduced in operation in the layer.

In the above neural network apparatus, in the at least one layer, the arithmetic unit (22) may use an output vector from a previous layer as an input vector (x) to decompose the input vector (x) into a sum of a product ($M_w C_w$) of an integer matrix serving as an input basis matrix ($M_x$) and a real number vector serving as an input coefficient vector ($c_x$) and an input bias ($b_x$) ($x = M_x c_x + b_x 1$) and derive a product of the input vector (x) and the weight matrix (W) ($W^T x = (M_w C_w)^T (M_x c_x + b_x 1)$).

In this configuration, since, in the operation of deriving the product of the input vector (x) and the weight matrix (W), the product operation between the input basis matrix ($M_x$) and the weight basis matrix ($M_w$) can be product operation between integer matrices, the memory consumption amount can be reduced, and the operation amount can be reduced.

In the above neural network apparatus, the weight basis matrix ($M_w$) may be a binary matrix, and the input basis matrix ($M_x$) may be a binary matrix, and the arithmetic unit (22) may conduct product operation ($M_w M_x$) between the weight basis matrix ($M_w$) and the input basis matrix ($M_x$) with use of logical operation and bit count.

In this configuration, since the product operation between the input basis matrix ($M_x$) and the weight basis matrix ($M_w$) in the operation of deriving the product of the input vector (x) and the weight matrix (W) can be product operation between binary matrices and can be conducted with use of the logical operation and the bit count, the operation of deriving the product of the input vector (x) and the weight matrix (W) can be performed at high speed.

In the above neural network apparatus, the weight basis matrix ($M_w$) may be a ternary matrix, and the input basis matrix ($M_x$) may be a binary matrix, and the arithmetic unit (22) may conduct product operation ($M_w M_x$) between the weight basis matrix ($M_w$) and the input basis matrix ($M_x$) with use of logical operation and bit count.

In this configuration, since the product operation between the input basis matrix ($M_x$) and the weight basis matrix ($M_w$) in the operation of deriving the product of the input vector (x) and the weight matrix (W) can be product operation between a binary matrix and a ternary matrix and can be conducted with use of the logical operation and the bit count, the operation of deriving the product of the input vector (x) and the weight matrix (W) can be performed at high speed.

In the above neural network apparatus, the arithmetic unit (22) may decompose the input vector (x) by optimizing the input basis matrix ($M_x$) for the input vector (x).

In this configuration, the input coefficient vector ($c_x$) and the input bias ($b_x$) do not need to be derived each time the input vector (x) for the fully connected layer is acquired, and the operation amount of the fully connected layer can be reduced.

In the above neural network apparatus, for respective elements ($x_j$) of the input vector (x), the arithmetic unit (22) may optimize the input basis matrix ($M_x$) by selecting a nearest candidate from sums ($\beta c_x + b_x$) of products between all combinations ($\beta$) of rows of the input basis matrix corresponding to the respective elements of the input vector and the input coefficient vector ($c_x$) learned and the input bias ($b_x$) learned.

In this configuration, the input basis matrix ($M_x$) can be optimized by means of a one-dimensional nearest neighbor search.

In the neural network apparatus, the storage unit (24) may store a lookup table (LUT) specifying a relationship between a value of each of the respective elements (x) of the input vector and a value ($m_x^{(j)}$) of the input basis matrix in the nearest candidate for the value, and the arithmetic unit (22) may optimize the input basis matrix ($M_x$) for the input vector (x) by looking up the lookup table (LUT).

In this configuration, the optimization of the input basis matrix ($M_x$) for the input vector (x) can be performed at high speed.

In the above neural network apparatus, the storage unit (24) may store, for the respective elements ($x_j$) of the input vector, all the combinations ($\beta$) of the rows of the input basis matrix corresponding to the respective elements ($x_j$) of the input vector and midpoints ($mp_j$) obtained when approximate candidates (p) of the respective elements of the input vector acquired by combinations ($\beta$) are arranged according to size, and the arithmetic unit (22) may determine, for the respective elements ($x_j$) of the input vector, the rows ($m_x^{(j)}$) of the input basis matrix corresponding to the respective elements ($x_j$) of the input vector by means of a binary tree search method using the midpoints ($mp_j$) to optimize the input basis matrix ($M_x$).

In this configuration, the optimization of the input basis matrix ($M_x$) for the input vector (x) can be performed at high speed, and the memory capacity required for operation in the arithmetic unit (22) can be reduced.

In the above neural network apparatus, the neural network model may be a convolutional neural network model, in the convolutional neural network model, a plurality of filters of a convolutional layer may be collected and be regarded as the weight matrix (W), the convolutional layer may be regarded as a fully connected layer, and the weight matrix (W) may be constituted by a product of a weight basis matrix ($M_w$) of integers and a weight coefficient matrix ($C_w$) of real numbers, and the arithmetic unit (22) may derive a product of the input vector (x) decomposed and the weight matrix (W) decomposed in the convolutional layer regarded as the fully connected layer.

In this configuration, in the operation of the convolutional layer in the convolutional neural network model, the memory consumption amount can be reduced, and the operation amount can be reduced.

A neural network apparatus according to an aspect is a neural network apparatus performing recognition with use of a neural network model, and logical operation is conducted as operation of at least one layer of the neural network model.

In this configuration, the operation of the neural network model can be performed at high speed by means of the logical operation.

A neural network apparatus according to an aspect is a neural network apparatus performing recognition with use of a neural network model, and a binary or ternary matrix for use in operation of at least one layer of the neural network model is stored.

In this configuration, the operation of the neural network model can be performed at high speed by the binary or ternary matrix.

A vehicle control system according to an aspect includes the aforementioned neural network apparatus (20), an in-vehicle sensor (30) acquiring the input information, and a vehicle control apparatus (40) controlling a vehicle based on the output.

In this configuration, the vehicle can be controlled based on recognition by means of the neural network model.

A decomposition device according to an aspect includes an acquisition unit (11) acquiring a neural network model, a weight decomposition unit (12) decomposing a weight matrix of at least one layer of the neural network model into a product ($M_w C_w$) of an integer matrix serving as a weight basis matrix ($M_w$) and a real number matrix serving as a weight coefficient matrix ($C_w$), and an output unit (14) outputting the weight basis matrix ($M_w$) and the weight coefficient matrix ($C_w$).

In this configuration, the weight basis matrix ($M_w$) and the weight coefficient matrix ($C_w$) for building the above neural network apparatus can be acquired.

The above decomposition device may further include a before-input decomposition unit (13) learning an input coefficient vector ($c_x$) and an input bias ($b_x$) for decomposing an input vector (x) into a sum of a product of an integer matrix serving as an input basis matrix ($M_x$) and a real number vector serving as an input coefficient vector ($c_x$) and the input bias ($b_x$) ($x = M_x c_x + b_x 1$), and the output unit (14) may output the input coefficient vector ($c_x$) acquired by the learning.

In this configuration, the coefficient vector ($c_x$) and the input bias ($b_x$) for decomposing the input vector (x) can be acquired by learning beforehand.

In the above decomposition device, the before-input decomposition unit (13) may generate a lookup table (LUT) for optimizing the input basis matrix ($M_x$) for the input vector (x), and the output unit (14) may output the lookup table (LUT).

In this configuration, the lookup table (LUT) for decomposing the input vector (x) at high speed can be acquired beforehand.

A program according to an aspect is a program causing a computer to function as a neural network apparatus inputting input information into an input layer of a neural network model and acquiring output information from an output layer. A storage unit (24) of the computer has stored therein a weight basis matrix ($M_w$) of integers and a weight coefficient matrix ($C_w$) of real numbers acquired by decomposing a weight matrix (W) of at least one fully connected layer of the neural network model, an input coefficient vector ($c_x$) out of the input coefficient vector ($c_x$) and an input bias ($b_x$) acquired by learning for decomposing an input vector (x) into a sum of a product of an input basis matrix ($M_x$) of integers and the input coefficient vector ($c_x$) of real numbers and the input bias ($b_x$), and a lookup table (LUT) specifying a relationship between a value ($x_j$) of each of respective elements of the input vector and a value ($m_x^{(j)}$) of the input basis matrix for the value acquired based on the input coefficient vector ($c_x$) and the input bias ($b_x$) acquired by the learning. The program causes the computer to function as an arithmetic unit, in the at least one fully connected layer of the neural network model, using an output vector from a previous layer as the input vector (x) to derive a product of the input vector (x) and the weight matrix (W) with use of the weight basis matrix ($M_w$), the weight coefficient matrix ($C_w$) of real numbers, and the input coefficient vector ($c_x$) read from the storage unit (24) and the input basis matrix ($M_x$) corresponding to the input vector (x) acquired by looking up the lookup table (LUT) read from the storage unit (24).

In this configuration, the weight matrix (W) of the fully connected layer in the neural network is constituted by the product ($M_w C_w$) of the weight basis matrix ($M_w$) of integers and the weight coefficient matrix ($C_w$) of real numbers, and in the operation of deriving the product of the input vector (x) and the weight matrix (W), the product operation between the input basis matrix ($M_x$) and the weight basis matrix ($M_w$) can be product operation between integer matrices. Accordingly, the memory consumption amount can be reduced, and the operation amount can be reduced. Since the input basis matrix ($M_x$) is optimized for the input vector (x) by looking up the lookup table, the operation of deriving the product of the input vector (x) and the weight matrix (W) can be performed at high speed.

A program according to an aspect is a program causing a computer to function as a neural network apparatus inputting input information into an input layer of a neural network model and acquiring output information from an output layer. A storage unit (24) of the computer has stored therein a weight basis matrix ($M_w$) of integers and a weight coefficient matrix ($C_w$) of real numbers acquired by decomposing a weight matrix (W) of at least one fully connected layer of the neural network model, an input coefficient vector ($c_x$) out of the input coefficient vector ($c_x$) and an input bias ($b_x$) acquired by learning for decomposing an input vector (x) into a sum of a product of an input basis matrix ($M_x$) of integers and the input coefficient vector ($c_x$) of real numbers and the input bias ($b_x$), and, for respective elements ($x_j$) of the input vector, all combinations (β) of rows of the input basis matrix corresponding to the respective elements ($x_j$) of the input vector and midpoints ($mp_i$) obtained when approximate candidates (p) of the respective elements ($x_j$) of the input vector acquired by combinations (β) are arranged according to size, acquired based on the input coefficient vector ($c_x$) and the input bias ($b_x$) acquired by the learning. The program causes the computer to function as an arithmetic unit (22), in the at least one fully connected layer of the neural network model, using an output vector from a previous layer as the input vector (x) to derive a product of the input vector and the weight matrix with use of the weight basis matrix ($M_w$), the weight coefficient matrix ($C_w$) of real numbers, and the input coefficient vector ($c_x$) read from the storage unit (24), and all the combinations (β) of the rows of the input basis matrix and the midpoints ($mp_i$).

In this configuration, the optimization of the input basis matrix ($M_x$) for the input vector (x) can be performed at high speed, and the memory capacity required for operation in the arithmetic unit (22) can be reduced.

A neural network apparatus according to an aspect includes a storage unit (24) storing a neural network model, and an arithmetic unit (22) inputting input information into an input layer of the neural network model and outputting an output layer. In at least one layer of the neural network model, the arithmetic unit (22) uses an output vector from a previous layer as an input vector (x) to decompose the input vector (x) into a sum of a product ($M_x c_x$) of an integer matrix serving as an input basis matrix ($M_x$) and a real number vector serving as an input coefficient vector ($c_x$) and an input bias ($b_x$) ($x=M_x c_x+b_x 1$) and derives a product of the input vector ($M_x c_x+b_x 1$) decomposed and the weight matrix (W) ($W^T x=W(M_x c_x+b_x 1)$).

In this configuration, in a case in which the weight matrix (W) is constituted by binary or ternary elements, in the operation of deriving the product of the input vector (x) and the weight matrix (W), the product operation between the input basis matrix ($M_x$) and the weight matrix (W) can be product operation between an integer matrix and a binary or ternary matrix, and the operation amount can thus be reduced.

Hereinbelow, embodiments will be described with reference to the drawings. In the present embodiment, a decomposition device 10 for building a memory-saving and high-speed neural network model and a neural network apparatus 20 acquiring output information from input information with use of the neural network model will be described. First, basic ideas in the present embodiment will be described. As described above, in an FC layer of the neural network, a process of calculating a product $W^T x$ of a weight matrix (filters) W and an input vector (input map) x is included. By decomposing the weight matrix W into a basis matrix of integers and a coefficient matrix of real numbers (integer decomposition) and decomposing the input vector x into a basis matrix of integers and a coefficient vector of real numbers (integer decomposition), the memory consumption amount can be reduced, the operation amount can be reduced, and the processing time can be shortened.

FIG. 1 describes calculation of the integer-decomposed product $W^T x$. Note that a bias b is omitted in FIG. 1. Also, a basis number $k_w$ is determined depending on the degree of the weight matrix W and is about ⅛ to ¼ of the weight matrix W. The basis number $k_x$ is about 2 to 4, for example. The product $W^T x$, including the bias b, can be expressed as Formula (6) shown below.

[Equation 5]

$$W^T x + b \approx (M_w C_w)^T (M_x c_x + b_x 1) + b = C_w^T M_w^T M_x c_x + b_x C_w^T M_w^T 1 + b \quad (6)$$

A basis matrix $M_w^T$ obtained by decomposing the weight matrix W is a binary or ternary matrix, and a basis matrix $M_x$ obtained by decomposing the input vector x is a binary matrix. Note that the basis matrix $M_x$ may be a ternary matrix as in a below example. "$M_w^T M_x$" in the first term of the right-hand side of Formula (6) is a product of a binary or ternary matrix and a binary or ternary matrix and can be calculated with use of logical operation (AND, XOR) and bit count. Also, a sum of a second term and a third term of the right-hand side can be calculated beforehand as described below. Accordingly, due to the decomposition in FIG. 1 and Formula (6), most of the operation can be covered by logical operation.

Figure 2:
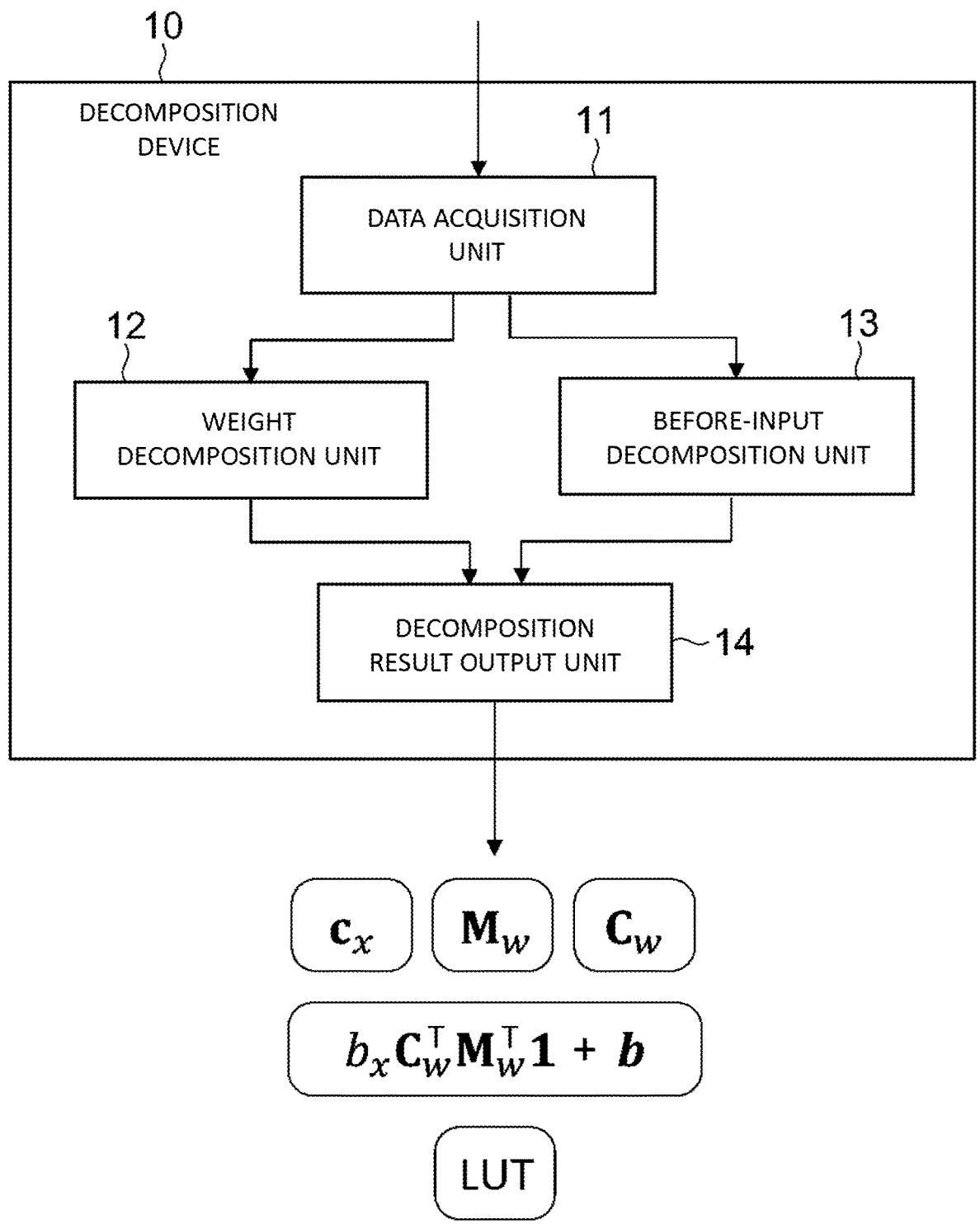
FIG. 2 illustrates a configuration of a decomposition device according to the embodiment.

FIG. 2 illustrates a configuration of a decomposition device for building the deep neural network according to the present embodiment. As illustrated in FIG. 2, the decomposition device 10 includes a data acquisition unit 11, a weight decomposition unit 12, a before-input decomposition unit 13, and a decomposition result output unit 14. The data acquisition unit 11 acquires component information of the neural network model according to the present embodiment (including the weight (filters) W and the bias b of each layer) and the input vector for learning.

The weight decomposition unit 12 decomposes the weight matrix W into a product of a coefficient matrix $C_w$ of real numbers and a binary or ternary basis matrix $M_w$. The before-input decomposition unit 13 derives by learning a product of a coefficient vector $c_x$ and a bias $b_x$ for decomposing an input vector x into a sum of the product of a binary or ternary basis matrix $M_x$ and the coefficient vector $c_x$ of real numbers and the bias $b_x$, and generates a lookup table LUT for deriving the basis matrix $M_x$ from the input vector x. The decomposition result output unit 14 uses the product of the coefficient matrix $C_w$ and the binary or ternary basis matrix $M_w$ acquired in the weight decomposition unit 12 and the lookup table LUT acquired in the before-input decomposition unit 13 to rebuild the neural network model and outputs the model to the neural network apparatus 20 to be described below. Hereinbelow, the respective functions will be described in detail.

(Decomposition of Weight Matrix)

Figure 3:
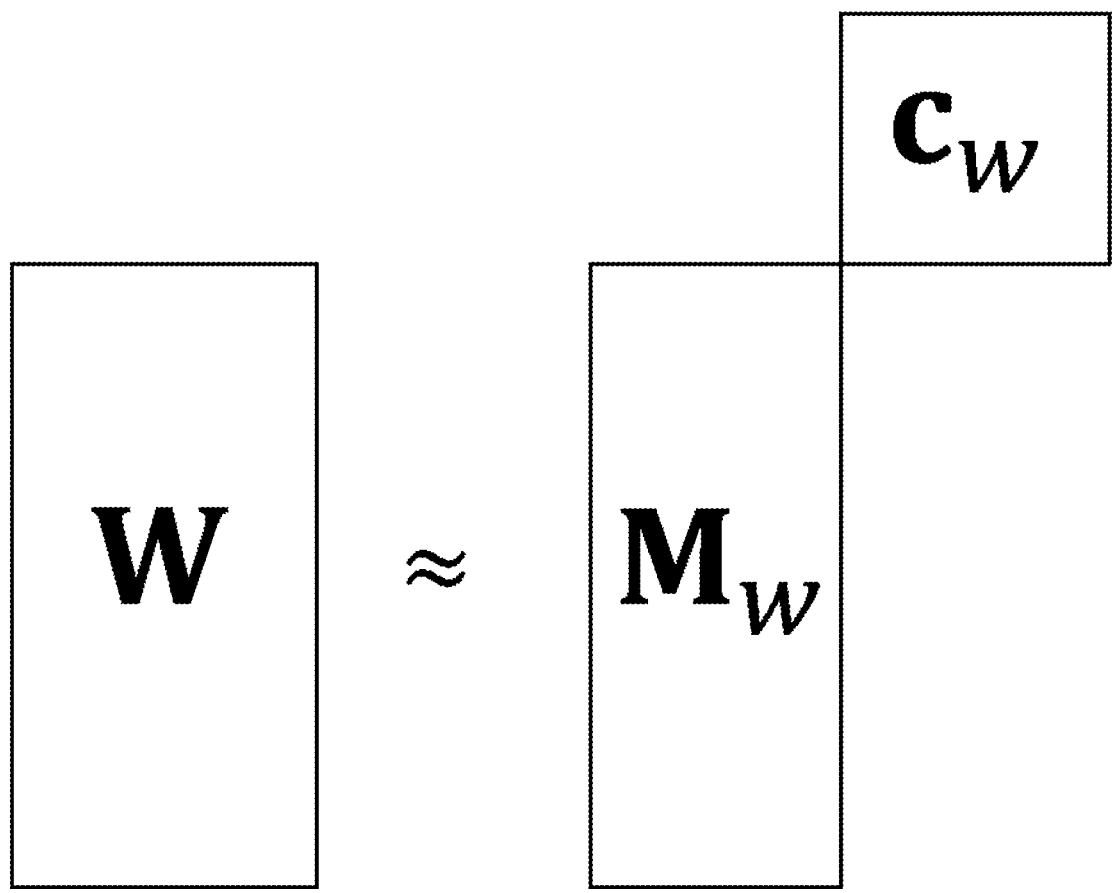
FIG. 3 illustrates processing of decomposing the weight matrix into a basis matrix and a coefficient matrix according to the embodiment.

The weight decomposition unit 12 decomposes the weight matrix W into the product of the coefficient matrix $C_w$ of real numbers and the basis matrix $M_w$ of integers. FIG. 3 illustrates processing of decomposing the weight matrix W into the basis matrix $M_w$ whose basis number is $k_w$ and the coefficient matrix $C_w$. In the present embodiment, the weight decomposition unit 12 decomposes the weight matrix W into the binary or ternary basis matrix $M_w$ and the coefficient matrix $C_w$ of real numbers. Hereinbelow, first to fourth methods for decomposing the weight matrix W into the binary or ternary basis matrix $M_w$ and the coefficient matrix $C_w$ of real numbers in the weight decomposition unit 12 according to the present embodiment will be described.

(First Decomposition Method)

As a first decomposition method, a data-independent decomposition method will be described. In the first decomposition method, the weight decomposition unit 12 conducts decomposition by solving a cost function $g_1$ expressing a decomposition error in the below formula.

[Equation 6]

$$g_1(M_w, C_w) = \|W - M_w C_w\|_F^2 \quad (7)$$

In the formula, the basis matrix $M_w$ is a binary matrix, and $ME \in \{-1, 1\}^{DO \times kw}$ is established.

Specifically, the weight decomposition unit 12 solves the above cost function $g_1$ in the following procedure.

(1) Randomly initialize the basis matrix $M_w$ and the coefficient matrix $C_w$.

(2) Fix the elements of the basis matrix $M_w$, and optimize the elements of the coefficient matrix $C_w$ by means of the least-square method. Update the elements of the coefficient matrix $C_w$ so that the cost function $g_1$ may be minimum.

(3) Fix the elements of the coefficient matrix $C_w$, and update the elements of the basis matrix $M_w$ by means of full search so that the cost function $g_1$ may be minimum.

(4) Repeat steps (2) and (3) until the results converge. For example, the convergence is determined when the cost function $g_1$ satisfies a predetermined convergence condition (for example, the reduction amount reaches a predetermined value or lower).

(5) Retain solutions obtained by steps (1) to (4) as candidates.

(6) Repeat steps (1) to (5), and adopt as final results the candidate basis matrix $M_w$ and the candidate coefficient matrix $C_w$ that can minimize the cost function $g_1$. Meanwhile, steps (1) to (5) may not be repeated. However, repeating the steps several times can avoid a problem dependent on an initial value.

Next, processing of updating the basis matrix $M_w$ in step (3) will be described. An element of the jth row vector in the basis matrix $M_w$ depends only on the jth element of the weight matrix W. Thus, since a value of each row vector in the basis matrix $M_w$ can be optimized independently from the other rows, exhaustive search (full search) can be performed per row in the basis matrix $M_w$. The binary decomposition according to the present embodiment provides the jth row vector in the basis matrix $M_w$ only in $2^{kw}$ forms (ternary decomposition in another case provides the jth row vector only in $3^{kw}$ forms). Accordingly, all of the elements are exhaustively checked, and a row vector that minimizes the cost function $g_1$ is adopted. This method is applied to all of the row vectors in the basis matrix M to update the elements of the basis matrix M.

(Second Decomposition Method)

As a second decomposition method, a data-independent decomposition method making the coefficient matrix $C_w$ sparse will be described. In the second decomposition method, the weight decomposition unit 12 conducts decomposition by solving a cost function $g_2$ expressing a decomposition error in the below formula.

[Equation 7]

$$g_2(M, C) = \|W - M_w C_w\|_F^2 + \lambda |C_w|_1 \quad (8)$$

In the formula, the basis matrix M is a binary matrix, and $M \in \{-1, 1\}^{DO \times k}$ is established. Also, $|C_w|_1$ is L1 norm of the elements of the coefficient matrix $C_w$, and $\lambda$ is a coefficient thereof.

The weight decomposition unit 12 solves the above cost function $g_2$ in the following procedure.

(1) Randomly initialize the basis matrix $M_w$ and the coefficient matrix $C_w$.

(2) Fix the elements of the basis matrix $M_w$, and optimize the elements of the coefficient matrix $C_w$ by means of the proximal gradient method.

(3) Fix the elements of the coefficient matrix $C_w$, and update the elements of the basis matrix M by means of full search so that the cost function $g_2$ may be minimum.

(4) Repeat steps (2) and (3) until the results converge. For example, the convergence is determined when the cost function $g_2$ satisfies a predetermined convergence condition (for example, the reduction amount reaches a predetermined value or lower).

(5) Retain solutions obtained by steps (1) to (4) as candidates.

(6) Repeat steps (1) to (5), and adopt as final results the candidate basis matrix $M_w$ and the candidate coefficient matrix $C_w$ that can minimize the cost function $g_2$. Meanwhile, steps (1) to (5) may not be repeated. However, repeating the steps several times can avoid a problem dependent on an initial value.

According to the second decomposition method, the coefficient matrix $C_w$ can be sparse. By making the coefficient matrix $C_w$ sparse, in calculation of the product $C_w^T M_w^T M_x$ in Formula 6, calculation of portions of the coefficient matrix $C_w$ related to zero elements can be omitted, and inner product calculation can be performed at higher speed.

(Third Decomposition Method)

Next, a third decomposition method will be described. In the first decomposition method, the decomposition error $$\|W - M_w C_w\|_F^2 \quad \text{[Equation 8]}$$

is defined as the cost function $g_1$ and is minimized.

However, the goal is to approximate the product $W^T x$ of the input vector x and the weight matrix W after the weight matrix W is approximated to the product of the basis matrix $M_w$ and the coefficient matrix $C_w$.

In the third decomposition method, S sample input vectors x are previously collected into $X \in R^{DO \times S}$. The decomposition error is defined as $$\|W^T X - (M_w C_w)^T X\|_F^2 \quad \text{[Equation 9]}$$

and is minimized. In the third decomposition method, the weight decomposition unit 12 conducts decomposition by solving a cost function $g_3$ in the below formula.

[Equation 10]

$$g_3(M, C) = \|W^T X - (M_w C_w)^T X\|_F^2 \quad (9)$$

According to this cost function $g_3$, the weight matrix W is decomposed in accordance with the actual data distribution, and approximation accuracy at the time of decomposition is thus improved.

This approximation decomposition can be performed by sequentially deriving basis vectors $m_m^{(j)}$ constituting the basis matrix $M_w$. The procedure of the third decomposition method is as follows.

(1) Derive the basis matrix $M_w$ and the coefficient matrix $C_w$ in the first or second decomposition method to set these values as initial values.

(2) Fix the elements of the basis matrix $M_w$, and optimize the elements of the coefficient matrix $C_w$ by means of the least-square method.

(3) Fix the elements of the coefficient matrix $C_w$, and optimize the elements of the basis matrix $M_w$ to update the elements of the basis matrix $M_w$. Processing of updating the basis matrix $M_w$ will be described below.

(4) Repeat steps (2) and (3) until the results converge, and retain the basis matrix $M_w$ and the coefficient matrix $C_w$ that minimize the cost function $g_3$ as candidates.

(5) Repeat steps (1) to (6), and adopt as final results the basis matrix $M_w$ and the coefficient matrix $C_w$ that minimize the cost function $g_3$. Meanwhile, in step (1), since the basis matrix $M_w$ and the coefficient matrix $C_w$ are optimized again in the first or second decomposition method, the initial values are changed. Also, step (5) may not be repeated.

However, repeating the step several times can avoid a problem dependent on an initial value.

Next, processing of updating the basis matrix $M_w$ in step (3) will be described. In a case of data-dependent decomposition, a value of each row vector in the basis matrix $M_w$ is not independent from the other rows but is dependent. Since the elements of the basis matrix $M_w$ are binary or ternary values or discrete values, the combinatorial optimization is applicable to optimization of the basis matrix $M_w$. Hence, for optimization of the basis matrix $M_w$, algorithms such as Greedy algorithm, Tabu search, and Simulated annealing can be used. Since good initial values are obtained in step (1), these algorithms can also successfully minimize the decomposition error.

For example, in a case of using the Greedy algorithm, the basis matrix $M_w$ is optimized in the following steps.

(3-1) Randomly select T elements of the basis matrix $M_w$.

(3-2) Try combinations in $2^T$ forms ($3^T$ forms in a case of below-mentioned ternary decomposition), and adopt a combination that minimizes the cost function $g_3$.

(3-3) Repeat steps (3-1) and (3-2) until the results converge.

(Fourth Decomposition Method)

A fourth decomposition method is a combination of the second and third decomposition methods. Specifically, decomposition is performed by solving a cost function $g_4$ in the below formula.

[Equation 11]

$$g_4(M, C) = \|W^T X - (M_w C_w)^T X\|_F^2 + \lambda |C_w|_1 \quad (10)$$

According to this cost function $g_4$, the weight matrix W is decomposed in accordance with the actual data distribution. Thus, approximation accuracy at the time of decomposition is improved, and the coefficient matrix $C_w$ can be sparse. That is, advantages of the second and third decomposition methods can be obtained. The specific decomposition procedure is similar to that of the third decomposition method.

In the decomposition according to the second embodiment, the weight matrix W is collectively decomposed. As the basis number k increases, decomposition will be difficult. In the present method, the real number matrix may sequentially be decomposed by means of the following algorithm.

Figure 4:
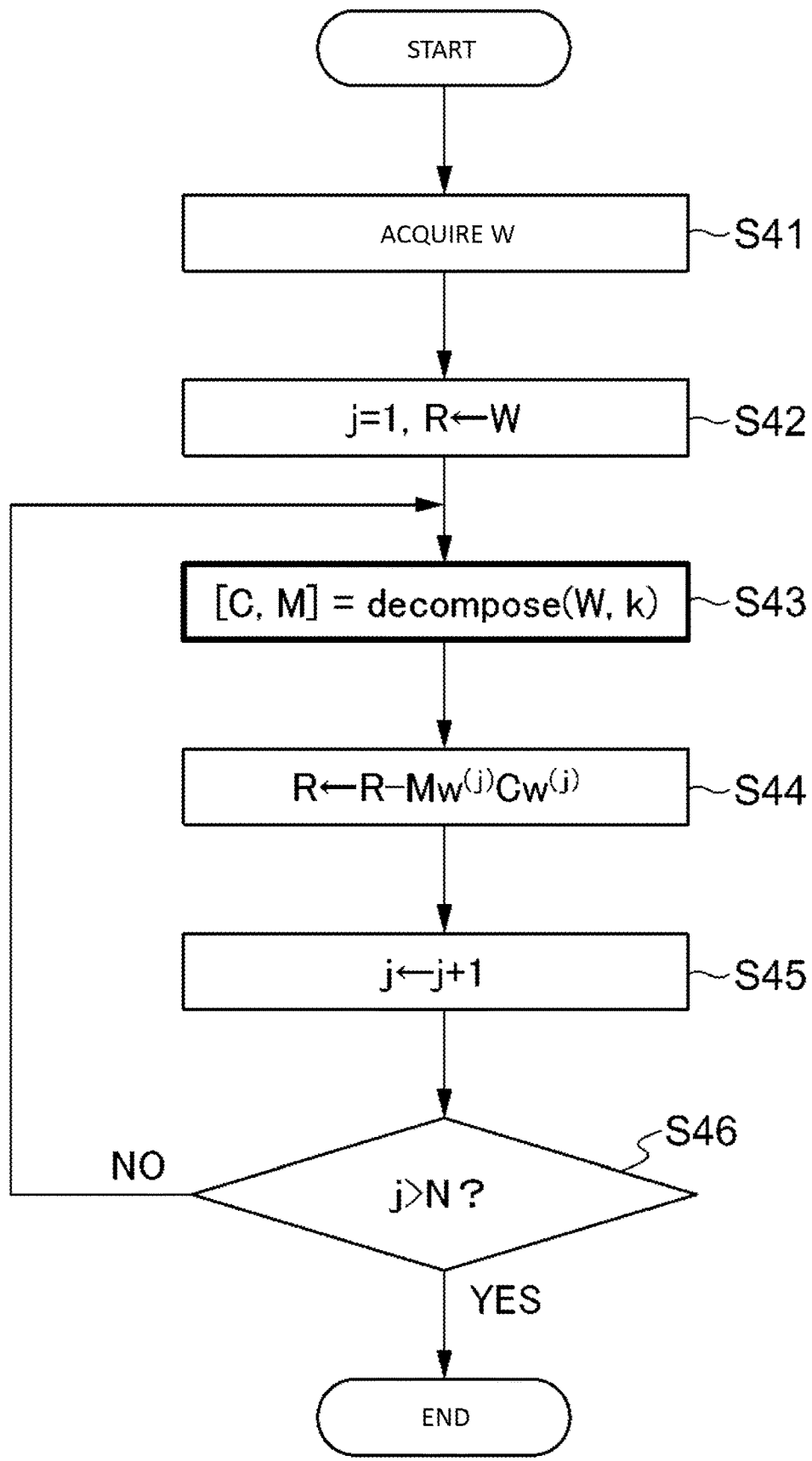
FIG. 4 is a flowchart of an algorithm conducted in a decomposition method according to the embodiment.

FIG. 4 is a flowchart of an algorithm conducted in the present decomposition method. It is to be noted that, in the following description, a procedure of decomposing the weight matrix W into the basis matrix $M_w$ containing $k_w$ bases and the coefficient matrix $C_w$ in the above first to fourth decomposition methods is expressed as the following formula.

[Equation 12]

$$[M, C] = \text{decompose}(W, k) \quad (11)$$

First, the weight decomposition unit 12 acquires the weight matrix W to be decomposed (step S41). Subsequently, the weight decomposition unit 12 sets an index j (j=1 to N) to 1 and substitutes the weight matrix W for a residual matrix R (step S42). The residual matrix R is a difference between a sum of inner products between the basis matrix $M_w^{(j)}$ and the coefficient matrix $C^{w(j)}$ decomposed by sequential decomposition and the weight matrix W.

Subsequently, the weight decomposition unit 12 decomposes the residual matrix R into the basis matrix $M_w$ and the coefficient matrix $C_w$ by the method according to the first or second embodiment (step S43). At this time, the basis number is $k_{wj}$. The basis number $k_w^{(j)} = k_w^{(1)}, k_w^{(2)}, \ldots k_w^{(N)}$ is stored in the weight decomposition unit 12 in advance. When $M_w^{(j)} C_w^{(j)}$ is acquired, the weight decomposition unit 12 sets a difference between the original residual matrix R and $M_w^{(j)} C_w^{(j)}$ as a new residual matrix R (step S44), increments the index j (step S45), and determines if the index j is higher than N, that is, if N-stage sequential decomposition is completed (step S46).

In a case in which the index j is N or lower (NO in step S46), the weight decomposition unit 12 returns to step S43 and decomposes the new residual matrix R acquired in step S44 again with use of the new j incremented in step S45. The above processing is repeated, and when the index j is higher than N (YES in step S46), the processing ends. Meanwhile, as described above, the N-stage basis numbers $k_w^{(j)} = k_w^{(1)}$, $k_w^{(2)}, \ldots, k_w^{(N)}$ are prepared in advance. They may be equal to or different from each other. Also, the basis number $k_w$ may be 8 or so, for example.

According to the present embodiment, as the basis number $k_w$ for decomposition is increased further, the accuracy can be closer to the original accuracy.

Figure 5:
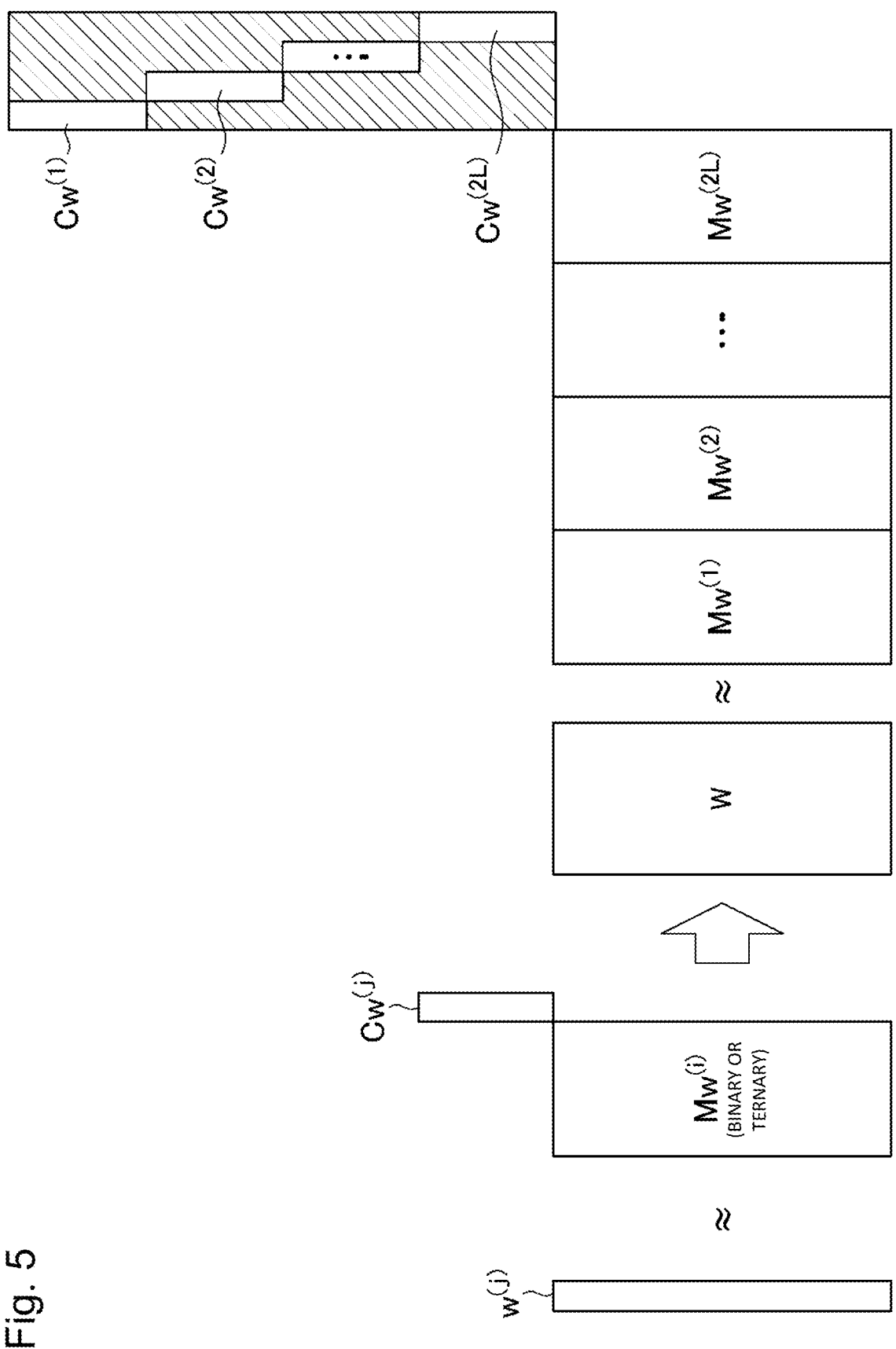
FIG. 5 illustrates a modification example of the processing of decomposing the weight matrix into the basis matrix and the coefficient matrix according to the embodiment.

FIG. 5 illustrates a modification example of processing of decomposing the weight matrix W into the basis matrix $M_w$ whose basis number is $k_w$ and the coefficient matrix $C_w$. In this modification example, as illustrated in FIG. 5, the jth column vector in the weight matrix W is separately decomposed and is collected. Decomposition per vector in this manner can cause calculation cost for decomposition to be reduced. Each vector may be decomposed in the above first to fourth decomposition methods.

Here, the jth column vector in the weight matrix W is expressed as $w^{(j)}$, and the jth column vector in the coefficient matrix $C_w$ is expressed as $c_w^{(j)}$. In the present embodiment, the weight matrix W in which the plurality of real number vectors $w^{(j)}$ are arranged can be regarded as one decomposed into the sum of products between the plurality of vectors in the basis matrix $M_w^{(i)}$ and the plurality of coefficient vectors $c_w^{(j)}$ in the matrix arranged obliquely as illustrated in FIG. 5. Meanwhile, the hatched part in the matrix in FIG. 5 contains 0.

(Decomposition of Input Vector)

Figure 6:
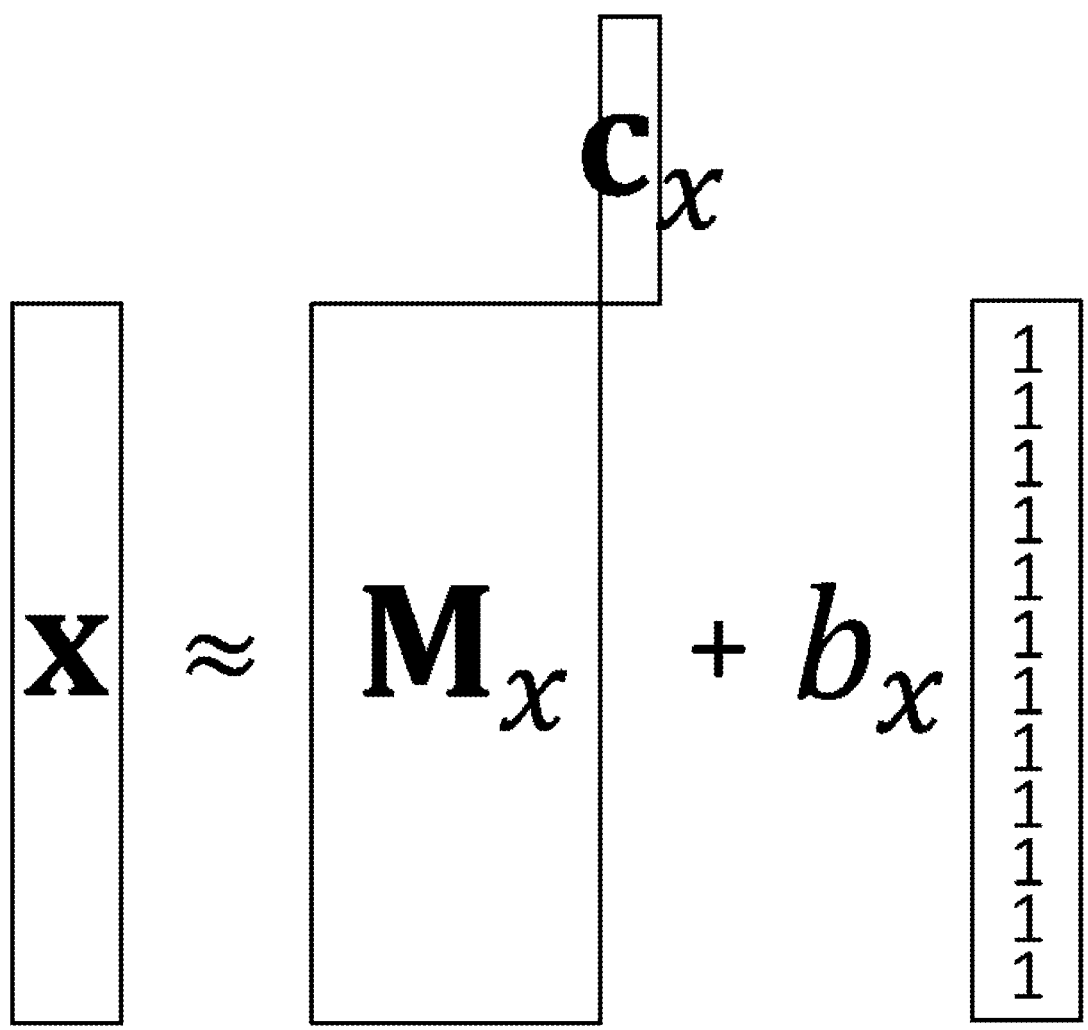
FIG. 6 illustrates a modification example of processing of decomposing the input vector into a product of the basis matrix and a coefficient vector and a bias according to the embodiment.

Next, decomposition of the input vector x will be described. FIG. 6 illustrates a modification example of processing of decomposing the input vector x into the product of the basis matrix $M_x$ whose basis number is $k_x$ and the coefficient vector $c_x$ and the bias $b_x$. The input vector x is decomposed as illustrated in FIG. 6 and Formula (12) shown below.

[Equation 13]

$$x \approx (M_x c_x + b_x 1) \quad (12)$$

The reason for considering the bias term $b_x 1$ is that, due to the influence of ReLU, the input vector (map) is not negative, and the bias is high. This bias term may be dispensed with, and whether or not the bias term is required depends on output of the previous layer.

The input vector x is input information or a vector acquired in each layer, and normally, the input vector x cannot be decomposed beforehand and is supposed to be decomposed at the time of execution in the neural network apparatus 20 to be described below. However, as described below, since $c_x$ and $b_x$ can be determined by learning beforehand, the before-input decomposition unit 13 determines $c_x$ and $b_x$ by learning beforehand. Accordingly, when the input vector x is acquired in each layer, optimizing only $M_x$ in response to the input vector x enables the input vector to be decomposed, and processing can be performed at high speed. In the present embodiment, the optimization of $M_x$ in response to the input vector x is also performed at high speed with use of the below-mentioned lookup table. The before-input decomposition unit 13 also performs processing of determining the lookup table by learning beforehand. The processing will be described in turn.

First, a method of decomposing the input vector x when the input vector x is acquired will be described. In this method, decomposition is conducted by solving a cost function $J_x$ expressing a decomposition error in the below formula.

[Equation 14]

$$J_x(M_x, c_x, b_x; X) = \|x - (M_x c_x + b_x 1)\|_2^2 \quad (13)$$

Specifically, the above cost function $J_x$ can be solved in the following procedure.

(1) Randomly initialize the basis matrix $M_x$.
(2) Fix the basis matrix $M_x$, and optimize the elements of the coefficient vector $c_x$ and the bias $b_x$ by means of the least-square method. Update the elements of the coefficient vector $c_x$ and the coefficient $b_x$ so that the cost function $J_x$ may be minimum.
(3) Fix the elements of the coefficient vector $c_x$ and the bias $b_x$, and update the elements of the basis matrix $M_x$ by means of full search so that the cost function $J_x$ may be minimum.
(4) Repeat steps (2) and (3) until the results converge. For example, the convergence is determined when the cost function $J_x$ satisfies a predetermined convergence condition (for example, the reduction amount reaches a predetermined value or lower).

Figure 7:
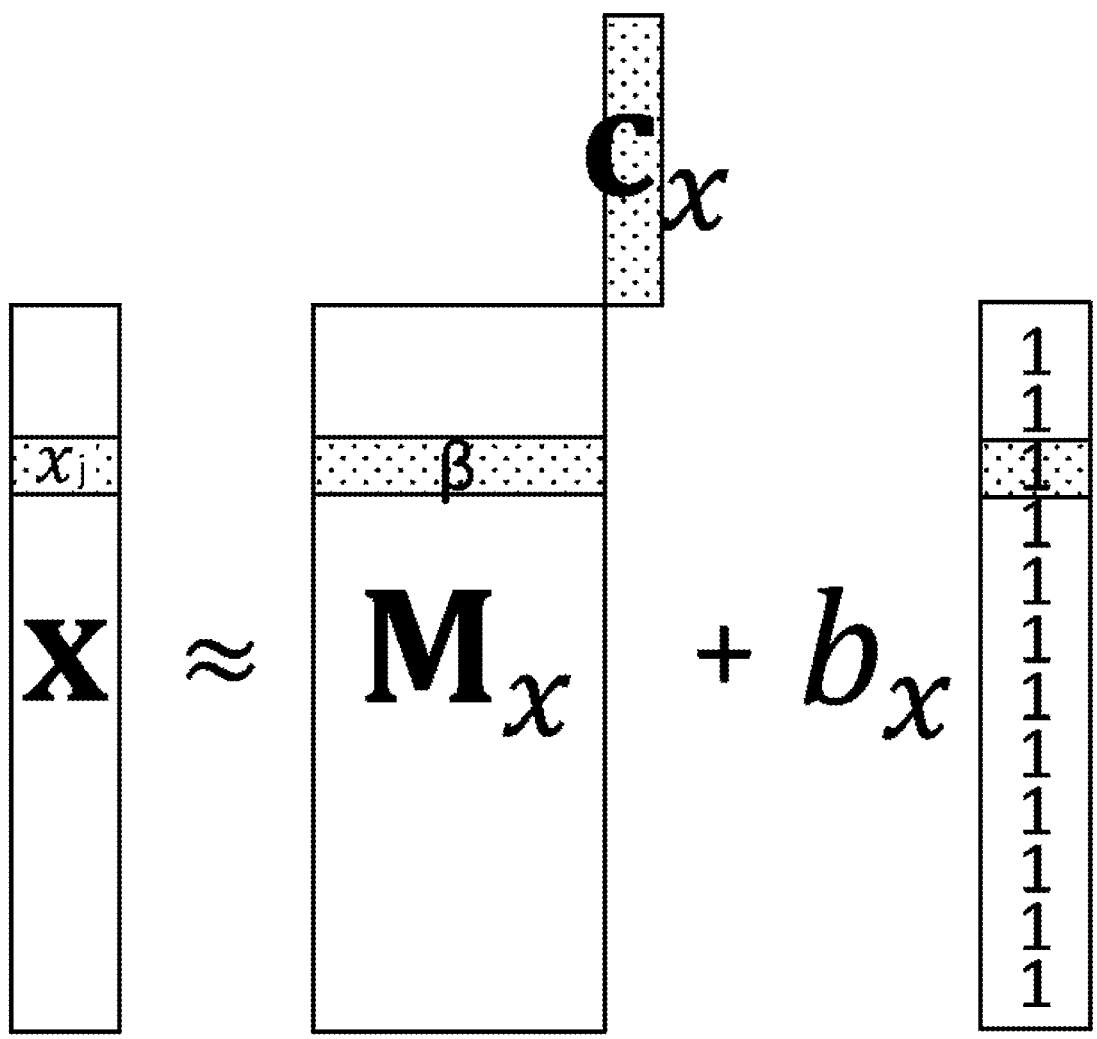
FIG. 7 describes update of the basis matrix of the input vector by means of full search according to the embodiment.

Hereinbelow, an example of a case in which the basis matrix $M_x$ is a ternary matrix will be described. In the full search in step (3), in a case in which the jth row of $M_x$ is expressed as $m_x^{(j)}$, each row can independently be updated by means of full search in a manner of Formula (14) shown below and FIG. 7.

[Equation 15]

$$m_x^{(j)} = \underset{\beta \in \{-1, 0, +1\}^{1 \times k_x}}{\arg\min} (x_j - (\beta c_x + b_x))^2, \, j = 1, \ldots, D_I \quad (14)$$

In each layer, when the input vector x is acquired, the input vector can be decomposed into the basis matrix $M_x$ and the coefficient vector $c_x$ by solving the above cost function $J_x$. However, conducting this decomposition in each layer at the time of execution will require significant processing time, and this technique cannot be applied to detection of pedestrians by means of an in-vehicle camera or the like. Under such circumstances, the present inventor has focused attention on the following point.

In Formula (14), first, it can be assumed that $c_x$ and $b_x$ determine a value range of x. It can also be assumed that $M_x$ indicates to which value in the value range determined by $c_x$ and $b_x$ the value x corresponds. Since every element has a similar value range of x, only $c_x$ and $b_x$ can be determined in the decomposition device 10 by learning beforehand, and only $M_x$ can be optimized at the time of execution in the neural network apparatus 20 to be described below. This can speed up decomposition at the time of execution. Although it is preferable to optimize the three values of $c_x$, $b_x$, and $M_x$ at the time of execution, in actual cases, optimizing only $M_x$ as described above is sufficiently practical.

Figure 8:
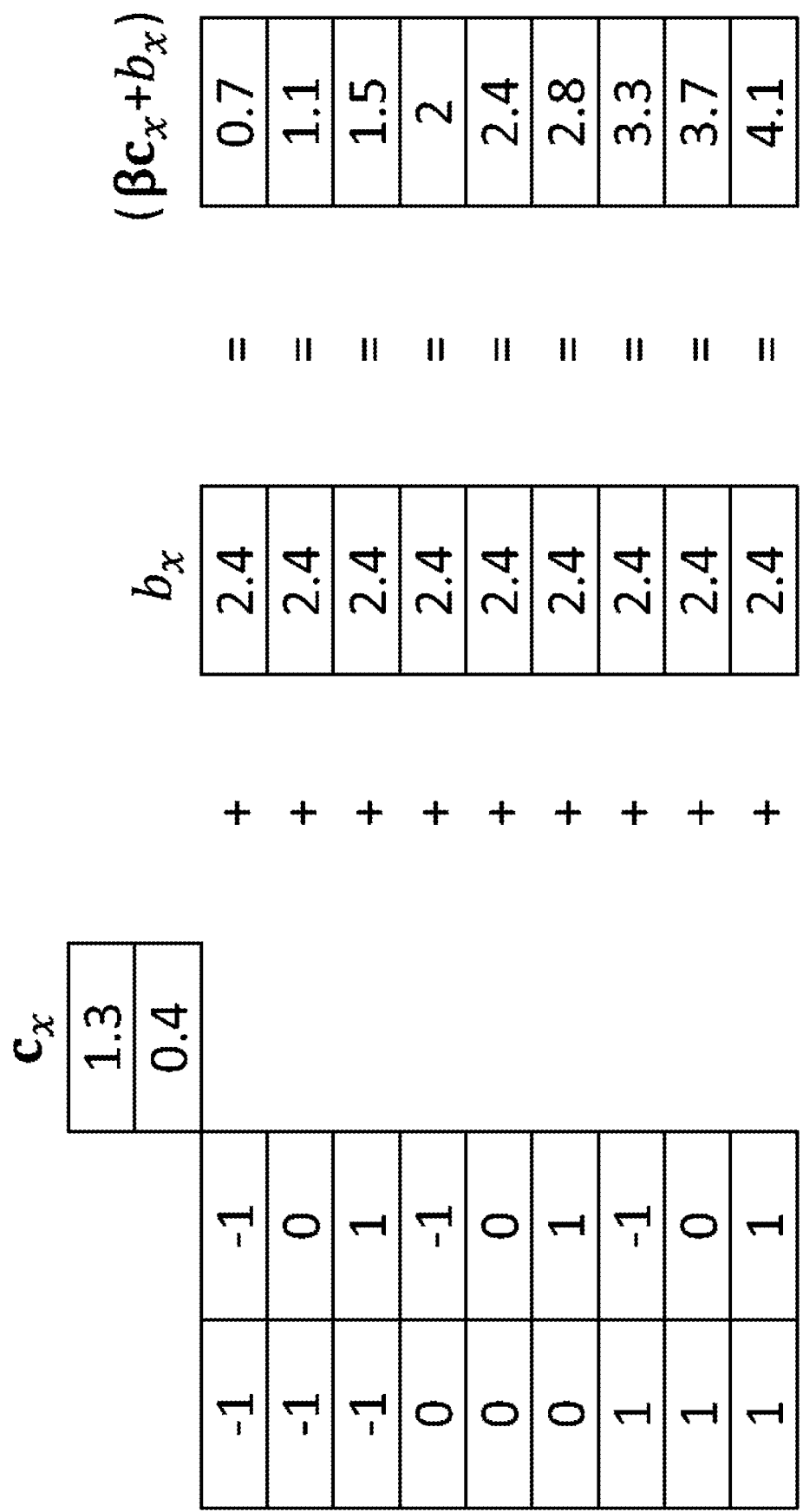
FIG. 8 describes optimization of the basis matrix of the input vector according to the embodiment.
Figure 9:
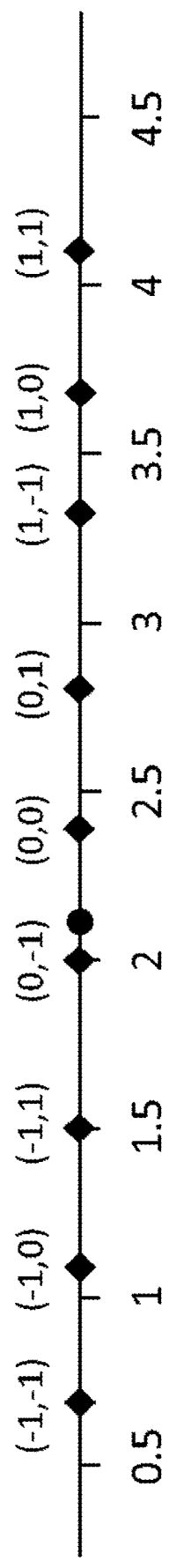
FIG. 9 describes the optimization of the basis matrix of the input vector according to the embodiment.

Consequently, to optimize only $M_x$, all that needs to be done is to calculate only Formula (14). Formula (14) can be regarded as a one-dimensional nearest neighbor search of selecting the nearest candidate from $3^{k_x}$ ($2^{k_x}$ in a case in which $M_x$ is a binary matrix) ($\beta c_x + b_x$) candidates. For example, in a case of $k_x = 2$, $c_x = (1.3, 0.4)^T$, and $b_x = 2.4$, $3^{k_x}$ ($\beta c_x + b_x$) candidates are as illustrated in FIG. 8. FIG. 9 illustrates the respective ($\beta c_x + b_x$) candidates in FIG. 8 arrayed on a number line. As illustrated in FIG. 9, in a case in which a certain column $x_j$ of the input vector x is 2.1, it is apparent from FIG. 9 that the nearest candidate is $m_x^{(j)} = (0, -1)$, which is the optimal value.

Figure 10:
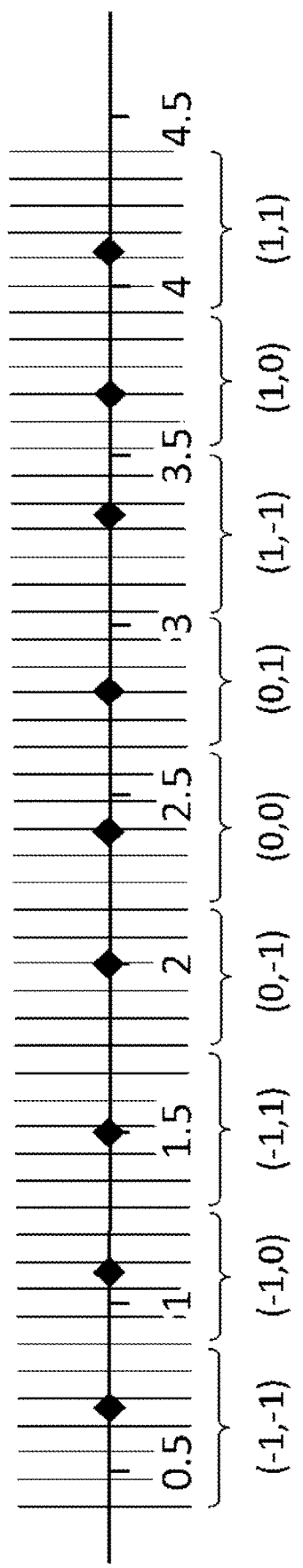
FIG. 10 describes the optimization of the basis matrix of the input vector according to the embodiment.

FIG. 10 illustrates a state in which the number line in FIG. 9 is divided at equal spaces to set a plurality of bins. The before-input decomposition unit 13 generates the lookup table LUT on which β, serving as the optimal value is specified for each of the plurality of bins set by dividing the number line in FIG. 9 at equal spaces. In the neural network apparatus 20, since, when the input vector x is acquired, the lookup table LUT is looked up to search a bin which the input vector x belongs to, $m_x^{(j)}$ can be derived at extremely high speed.

The decomposition result output unit 14 calculates the sum of the second term and the third term of the right-hand side of Formula (6) with use of $M_w$ and $C_w$ acquired by decomposing the weight matrix W in the weight decomposition unit 12 and the coefficient vector $c_x$ and the bias $b_x$ acquired in the before-input decomposition unit 13. As described above, since $c_x$, $b_x$, $M_w$, and $C_w$ are acquired in the weight decomposition unit 12 and the before-input decomposition unit 13, the sum of the second term and the third term of the right-hand side of Formula (6) can be calculated.

The decomposition result output unit 14 outputs $c_x$, $M_w$, and $C_w$ for calculating the first term of the right hand side of Formula (6), the sum of the second term and the third term of the right-hand side of Formula (6), and the lookup table $LUT^{(j)}$ (j=1, ..., $D_I$) for deriving each row vector $m_x^{(j)}$ of $M_x$ to the neural network apparatus 20 for each FC layer.

It is to be noted that, hereinbelow, $M_w$ is referred to as "a weight basis matrix," $C_w$ is referred to as "a weight coefficient matrix," $M_x$ is referred to as "an input basis matrix," $c_x$ is referred to as "an input coefficient vector," and $b_x$ is referred to as "an input bias."

Figure 11:
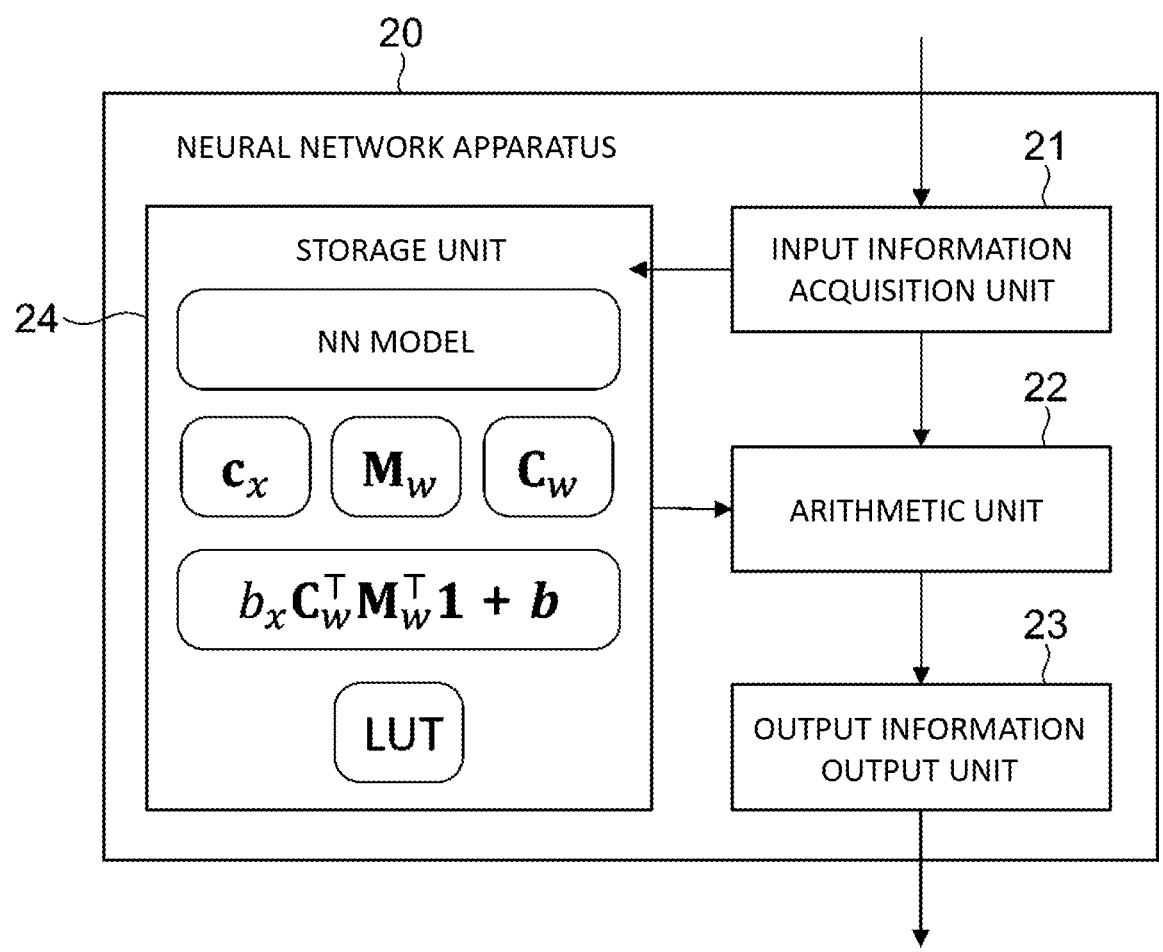
FIG. 11 illustrates a configuration of a neural network apparatus according to the embodiment.

FIG. 11 illustrates a configuration of the neural network apparatus 20. The neural network apparatus 20 includes an input information acquisition unit 21, an arithmetic unit 22, an output information output unit 23, and a storage unit 24. The storage unit 24 has stored therein a neural network model. For each FC layer, the storage unit 24 acquires from the decomposition device 10 and stores therein the input coefficient vector $c_x$, the weight basis matrix $M_w$, and the weight coefficient matrix $C_w$ for calculating the first term of the right hand side of Formula (6), the sum $(b_x C_w^T M_w^T 1 + b)$ of the second term and the third term of the right-hand side of Formula (6), and the lookup table $LUT^{(j)}$ (j=1, ..., $D_I$) for deriving each row vector $m_x^{(j)}$ of the input basis matrix $M_x$ generated in and output from the decomposition device 10.

The input information acquisition unit 21 is provided with input information to be processed. The arithmetic unit 22 reads out the neural network model from the storage unit 24, inputs the input information acquired in the input information acquisition unit 21 into an input layer to execute arithmetic processing, and acquires an output layer.

Figure 12:
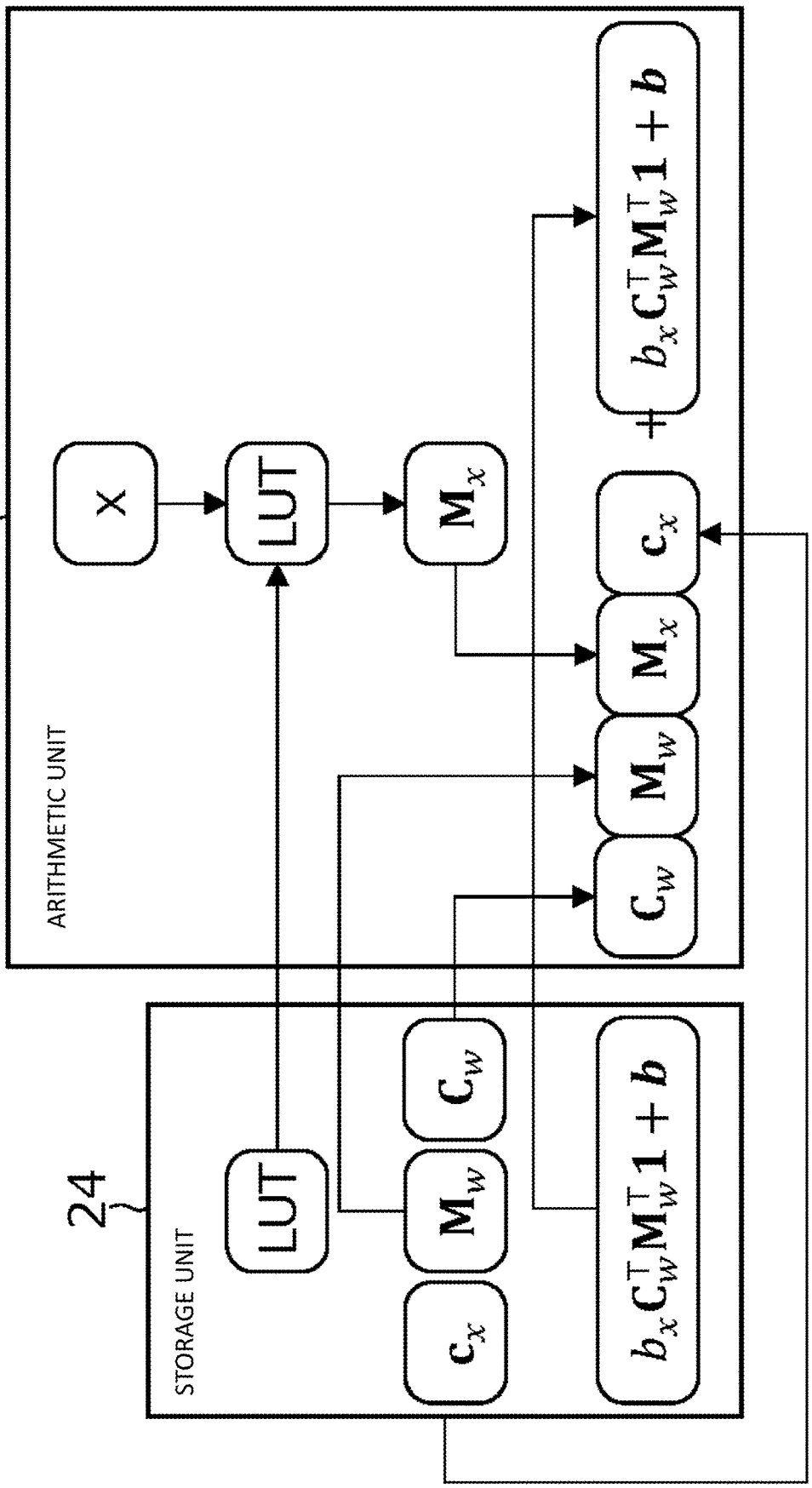
FIG. 12 illustrates processing of an arithmetic unit in an FC layer of a neural network model according to the embodiment.

FIG. 12 illustrates processing of the arithmetic unit 22 in the FC layer of the neural network model. In at least one FC layer, the arithmetic unit 22 uses the output vector from the previous layer as the input vector x to decompose the input vector x into the product of the binary input basis matrix $M_x$ and the input coefficient vector $c_x$ of real numbers and the input bias $b_x$ and derives the product of the input vector x and the weight matrix W. Specifically, in the FC layer, when the arithmetic unit 22 acquires an output from the previous layer, the arithmetic unit 22 conducts operation of Formula (6) with the output used as the input vector x to derive the product of the input vector x and the weight matrix W.

As illustrated in FIG. 12, the arithmetic unit 22 looks up the lookup table LUT read from the storage unit 24 to derive the binary input basis matrix $M_x$ corresponding to the input vector x. Subsequently, the arithmetic unit 22 calculates the first term ($C_w^T M_w^T M_x C_x$) of the right hand side of Formula (6) with use of the acquired binary input basis matrix $M_x$, and the weight coefficient matrix $C_w$, the weight basis matrix $M_w$, and the input coefficient vector $c_x$ read from the storage unit 24.

The arithmetic unit 22 calculates a sum ($C_w^T M_w^T M_x C_x + b_x C_w^T M_w^T 1 + b$) of the value of the first term of the right hand side of Formula (6) acquired by the above calculation ($C_w^T M_w^T M_x c_x$) and the sum ($b_x C_w^T M_w^T 1 + b$) of the second term and the third term of the right-hand side of Formula (6) read from the storage unit 24. In addition, the arithmetic unit 22 inputs the calculation result into an activating function (for example, ReLU) to calculate an output of the present layer (input of the subsequent layer).

The arithmetic unit 22 conducts operation based on the neural network model while executing the above operation in the FC layer to finally acquire the output layer. The value of the output layer is output to the output information output unit 23. The output information output unit 23 outputs required output information based on the value of the output layer acquired in the arithmetic unit 22. For example, in a case in which the neural network model performs classification, the output information output unit 23 outputs, as output information, information in a class having the highest likelihood in the output layer.

As described above, in the FC layer of the neural network, memory-saving and high-speed operation is effective due to the decomposed weight matrix W and the lookup table LUT for decomposition of the input vector. However, as for a CONV layer serving as a middle layer, by arranging various filters (three dimensions), a four-dimensional data structure can be achieved, and the above high-speed method can be applied.

Figure 13:
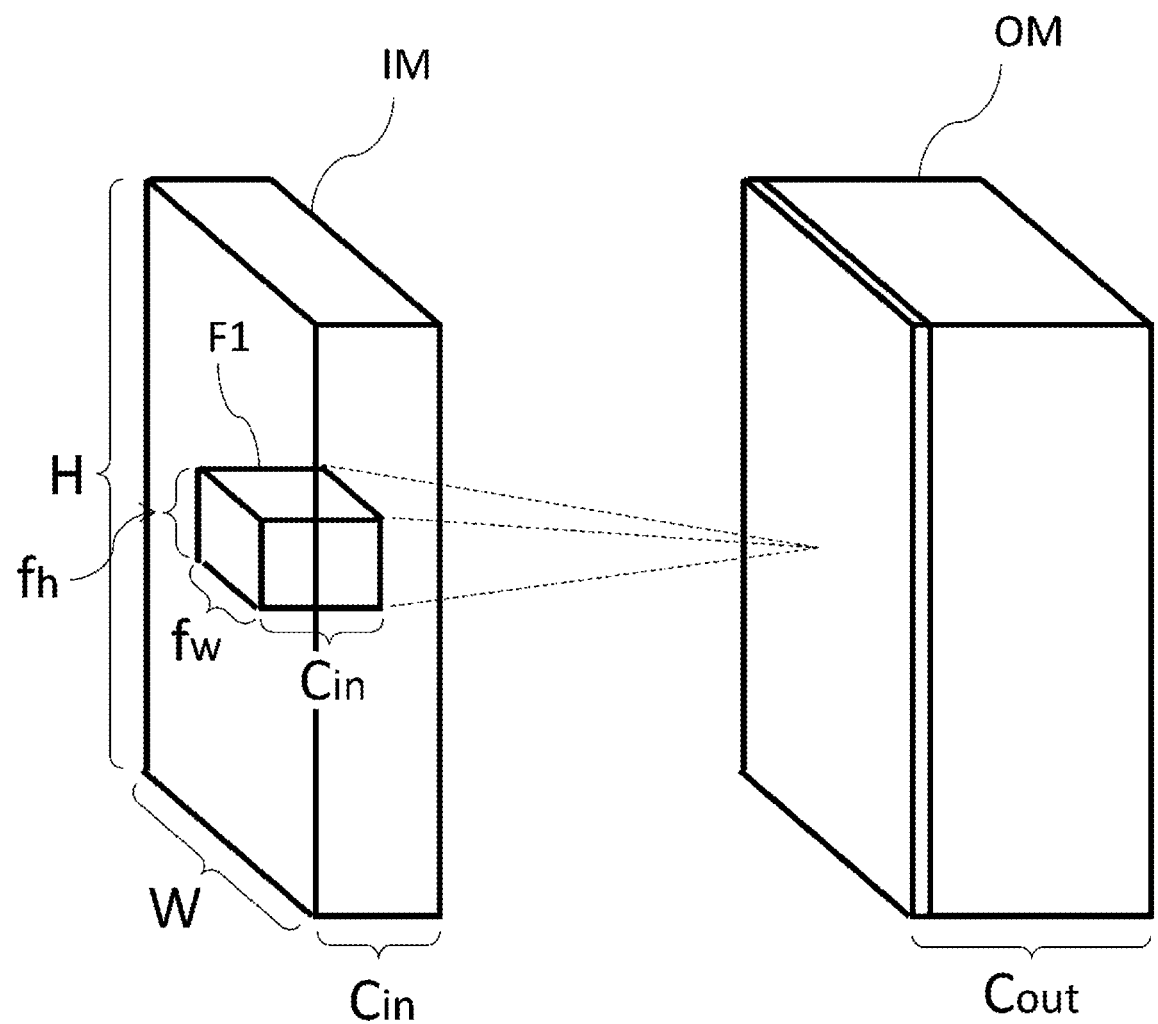
FIG. 13 illustrates a relationship between an input map and an output map of a CONV layer according to the embodiment.
Figure 14:
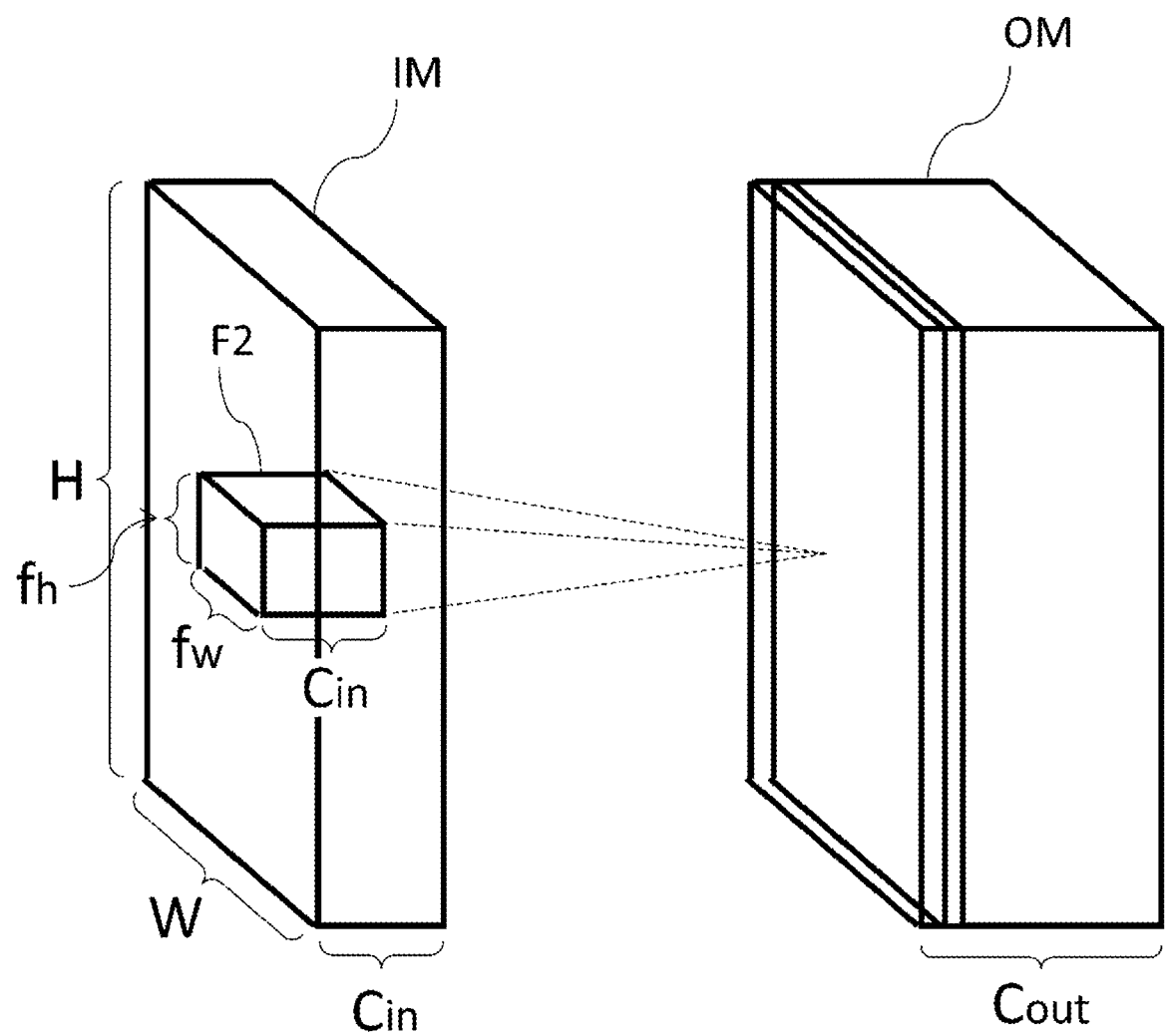
FIG. 14 illustrates the relationship between the input map and the output map of the CONV layer according to the embodiment.

Each of FIGS. 13 and 14 illustrates a relationship between an input map and an output map of the CONV layer. In each of FIGS. 13 and 14, the left side is an input map IM, the right side is an output map OM, and a rectangular solid applied to the input map is a three-dimensional filter F1 or F2. The filter F1 and the filter F2 are different from each other, and $C_{out}$ filters, which are different from each other, are prepared. The operation amount of a filter of each output map is $(f_h f_w C_{in}) \times (HW)$. The total amount of all of the filters is $(f_h f_w C_{in}) \times (HW) \times C_{out}$. In a case in which the present embodiment is not applied, the operation amount will be significantly large.

Figure 15:
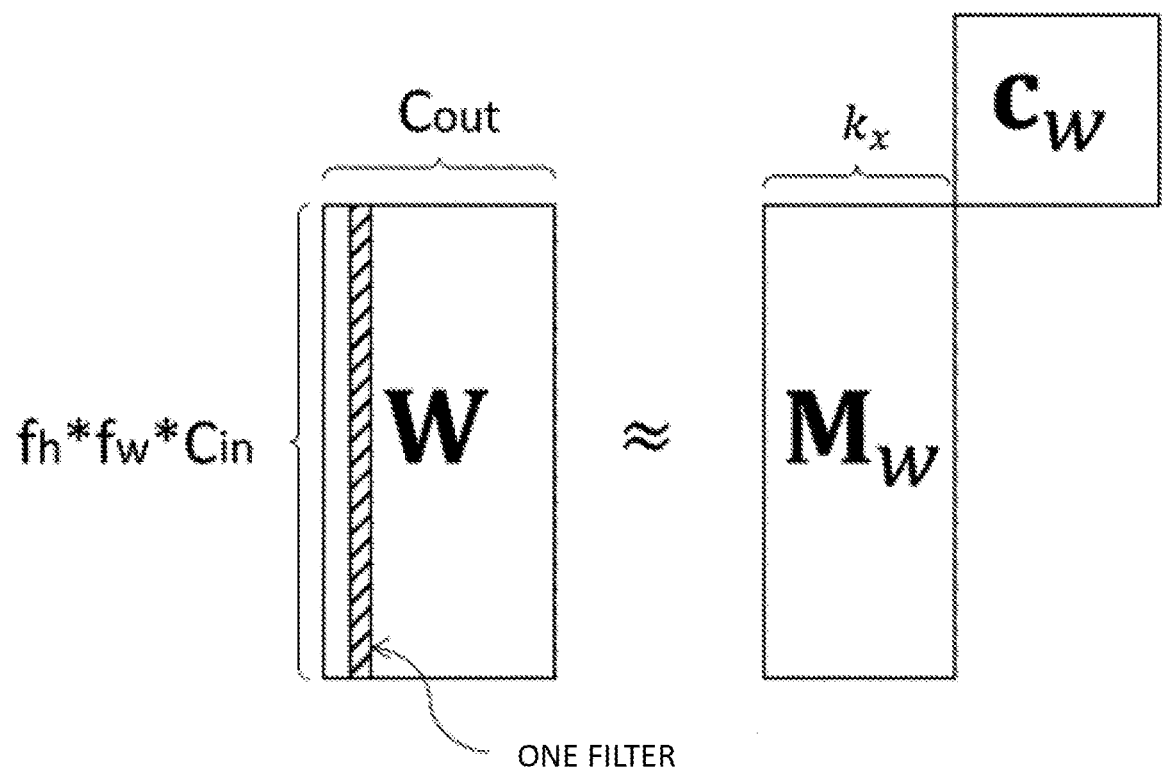
FIG. 15 illustrates decomposition of the weight matrix of the CONV layer according to the embodiment.
Figure 16:
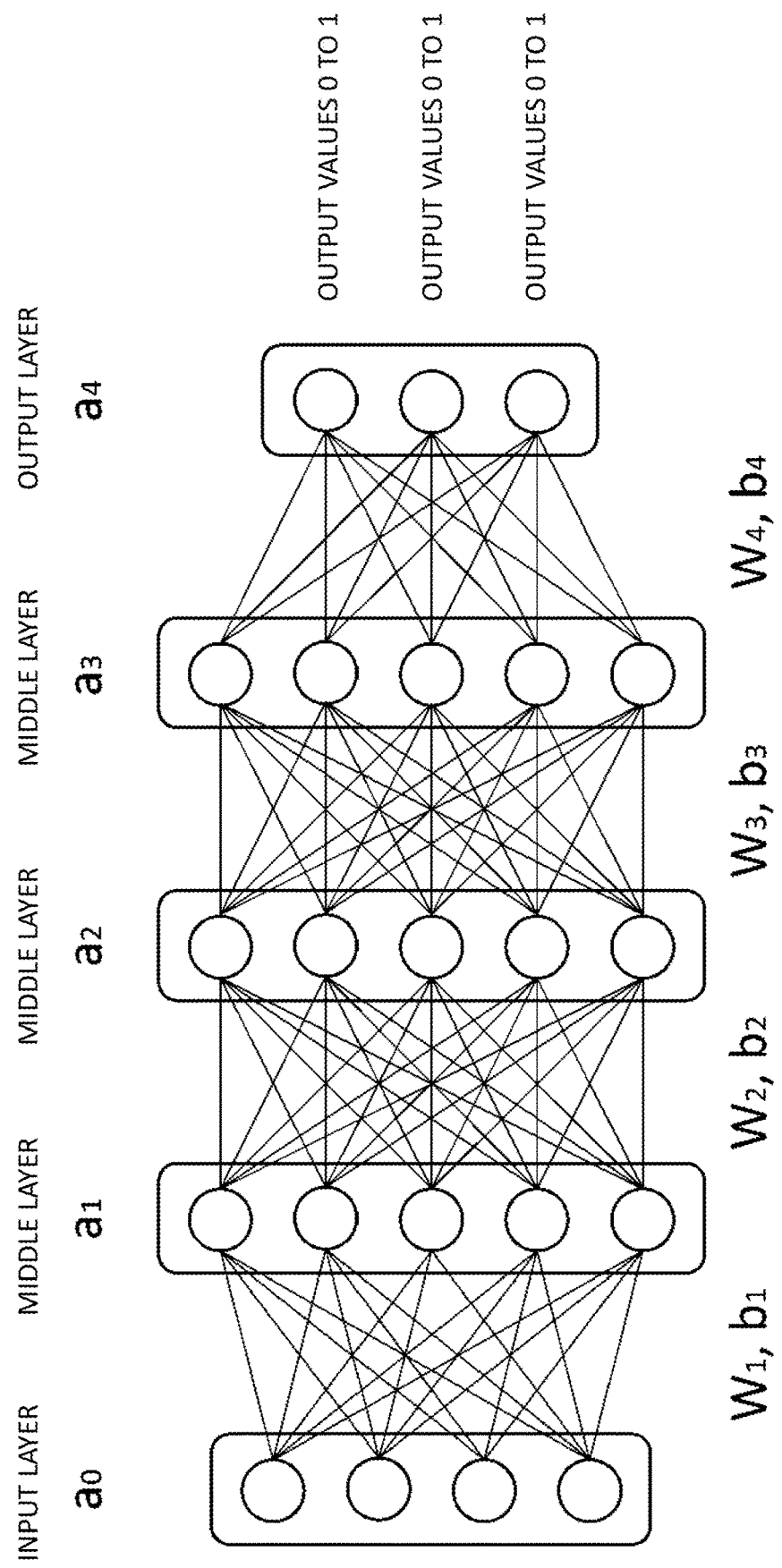
FIG. 16 illustrates an example of a neural network classifying a four-dimensional input vector into three classes.

Even in such a case, as illustrated in FIG. 15, the respective filters serve as column vectors and are arranged in the row direction to generate the weight matrix W. Consequently, the CONV layer can be regarded as the FC layer, and the aforementioned memory-saving and high-speed operation can be performed.

Table 1 is a table illustrating a comparison of the operation amount required in each FC layer between the neural network apparatus 20 according to the present embodiment and a conventional art.

TABLE 1

| | | FLOATING-POINT PRODUCT-SUM OPERATION | LOGICAL OPERATION | | |
| --- | --- | --- | --- | --- | --- |
| | | | AND | XOR | Bit Count |
| CONVENTIONAL ART | $W^T x$ | $D_I D_o$ | 0 | 0 | 0 |
| PRESENT TECHNIQUE | $C_w^T M_w^T M_x C_x$ | $k_x k_w + k_w D_o$ | $D_I k_x k_w / B$ | $D_I k_x k_w / B$ | $D_I k_x k_w / B$ |

In Table 1, B is a bit wide of a variable (register) subjected to logical operation. While $D_I$ or $D_O$ is about several hundred to several thousand, $k_x$ is about 2 to 4, and $k_w$ is about $D_O/8$ to $D_O/4$, as described above. Hence, in the present embodiment, the operation amount is smaller than that in the conventional art.

Table 2 is a table illustrating a comparison of the memory consumption amount in each FC layer between the neural network apparatus 20 according to the present embodiment and the conventional art.

TABLE 2

| | VARIABLE | SIZE |
| --- | --- | --- |
| CONVENTIONAL ART | W | $32 \cdot D_I D_o$ |
| PRESENT TECHNIQUE | $M_w$ | $2 \cdot D_I k_w$ |
| | $C_w$ | $32 \cdot k_w D_o$ |
| | $c_x, b_x$ | $32 \cdot (k_w + 1)$ |

In Table 2, a single-precision real number (32 bits) is used as a real number. As is apparent from Table 2, in the present embodiment, the memory consumption amount is smaller than that in the conventional art.

With the division device 10 and the neural network apparatus 20 according to the present embodiment, the memory consumption amount in the FC layer can be reduced, and the operation amount in the FC layer can be reduced. Accordingly, the present embodiment is particularly effective in a case in which the neural network has a large number of layers (deep neural network), and in which the aforementioned memory-saving and high-speed operation can be applied to a plurality of layers.

Meanwhile, a computer including a storage device, a memory, an arithmetic processing device, and the like executes a program to cause the function of each of the aforementioned decomposition device 10 and neural network apparatus 20 to be fulfilled. In the above embodiment, although the decomposition device 10 and the neural network apparatus 20 have been described as separate devices, these devices may be configured as one computer.

Also, as described above, only $c_x$ and $b_x$ are determined beforehand, and only $M_x$ is optimized at the time of execution in the neural network apparatus 20. By doing so, decomposition of the input vector at the time of execution can be conducted at high speed. In the above embodiment, the specified matrix $M_x$ is derived, using, as an optimal input basis search method, a method of preparing and storing in the neural network apparatus 20 the lookup table LUT specifying $\beta$ optimizing $m_x^{(j)}$ for each of the plurality of bins, and when the input vector x is acquired in the neural network apparatus 20, looking up the lookup table LUT to search for a bin to which each element $x_j$ belongs to derive optimal $\beta$.

The optimal input basis search method is not limited to the above method. Hereinbelow, a modification example of the optimal input basis search method will be described. Hereinbelow, an example of a case in which the basis matrix $M_x$ is a binary matrix will be described. First, the before-input decomposition unit 13 calculates $(\beta c_x+b_x)$ for all of the candidates $\beta$ and $m_x^{(j)}$. For example, in a case of $k_x=4$, $c_x=(3.8, 8.6, 1.2, 0.4)^T$, and $b_x=15.2$, $(\beta c_x+b_x)$ values acquired when $\beta$ is provided in $2^{k_x}$ forms (in this example, since $k_x=4$, (is provided in $2^{k_x}=2^4=16$ forms) are as illustrated in FIG. 17. Hereinbelow, a value acquired by calculation of $(\beta C_x+b_x)$ for each $\beta$ is referred to as a prototype p.

Subsequently, the before-input decomposition unit 13 sorts the prototypes p according to the magnitude of the values. FIG. 18 illustrates a result of sorting the prototypes p according to the magnitude of the values in the example in FIG. 17. The prototypes p are provided with subscripts 1, 2, . . . , 16 in ascending order resulting from such sorting and are denoted as $p_1, p_2, \ldots, p_{16}$. Also, $\beta$ corresponding to each prototype $p_i$ (i=1 to 16) is denoted as $\beta_i$ (i=1 to 16).

Figure 19:
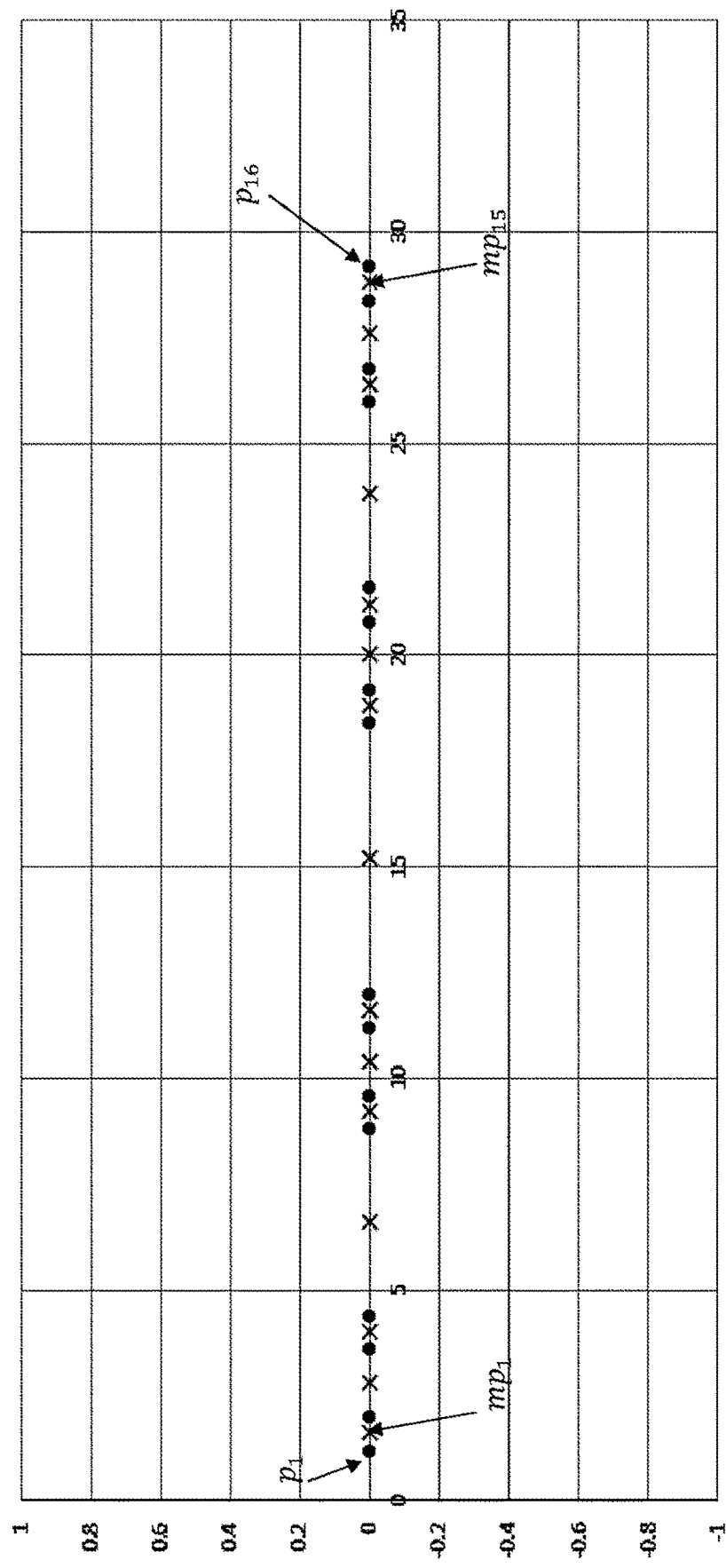
FIG. 19 illustrates a number line on which prototypes and midpoints are plotted according to the modification example of the embodiment.

Subsequently, the before-input decomposition unit 13 derives a midpoint $mp_i$ (i=1 to 15) between the adjacent prototypes $p_i$ sorted. FIG. 19 illustrates the respective $(\beta c_x+b_x)$ values in FIG. 18 arrayed on a number line and the midpoints $mp_i$ (i=1 to 15) thereof. Note that $mp_i=(p_i p_{i+1})/2$ is established.

Figure 20:
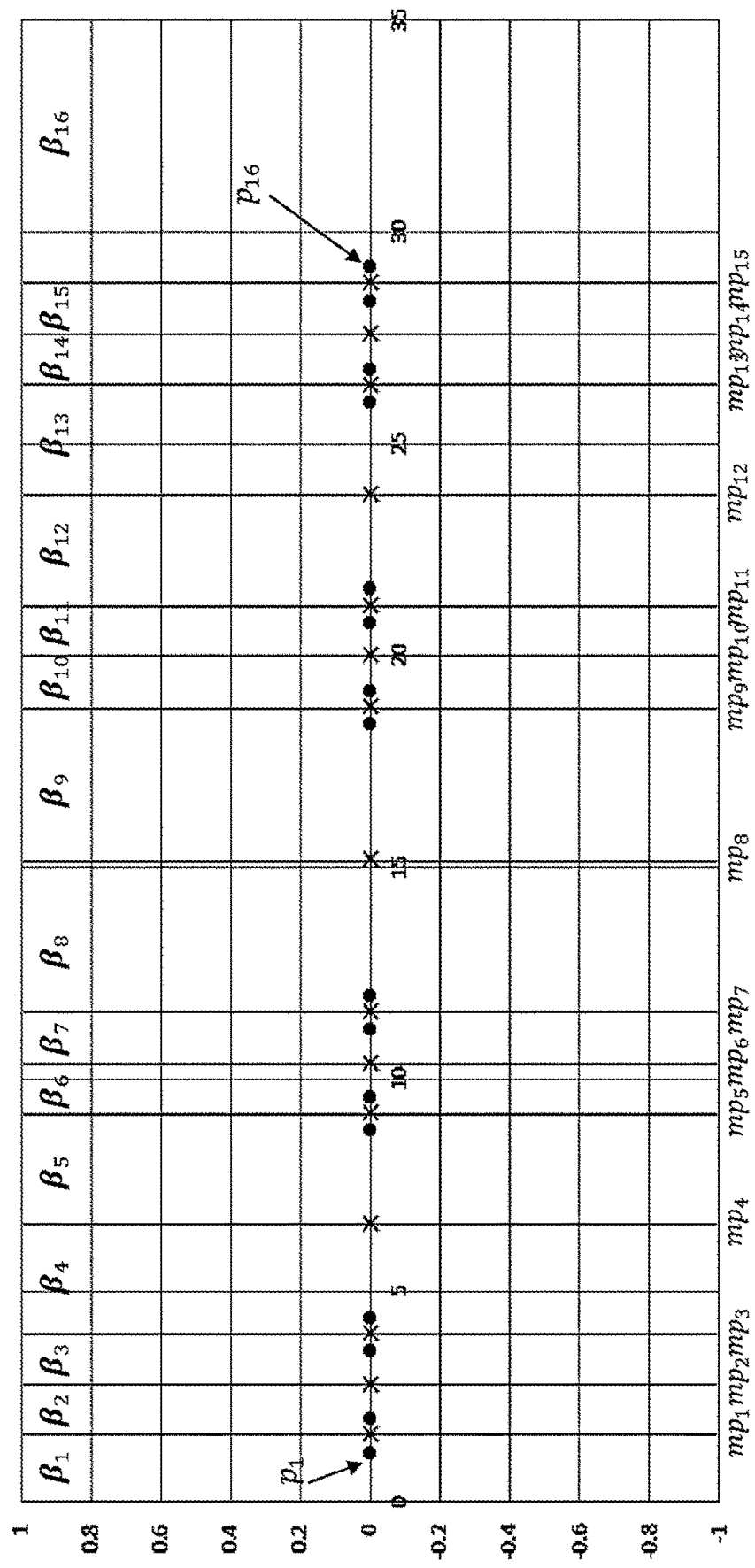
FIG. 20 illustrates the number line on which the prototypes and the midpoints are plotted according to the modification example of the embodiment.
Figure 21:
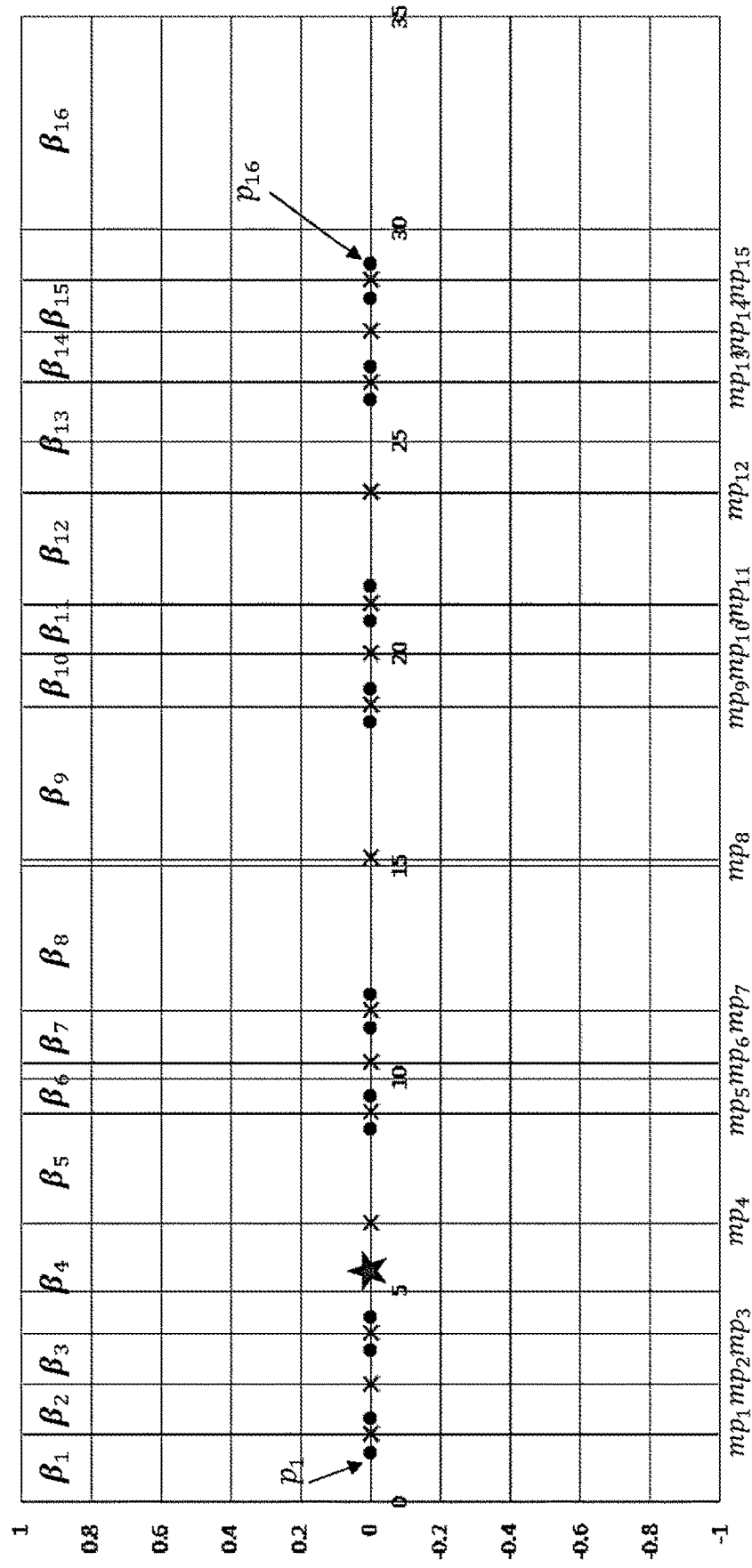
FIG. 21 describes assignment of β according to the modification example of the embodiment.

$\beta$ to be assigned to the value $x_j$ of each element of the input vector can be defined by the midpoints $mp_i$ serving as boundaries as illustrated in FIG. 20. For example, as illustrated in FIG. 21, $\beta_4$ (-1, -1, 1, 1) can be assigned to $x_j=5.8$. In a case in which this assignment is performed in the arithmetic unit 22 of the neural network apparatus 20, a binary search method can be used.

Figure 22:
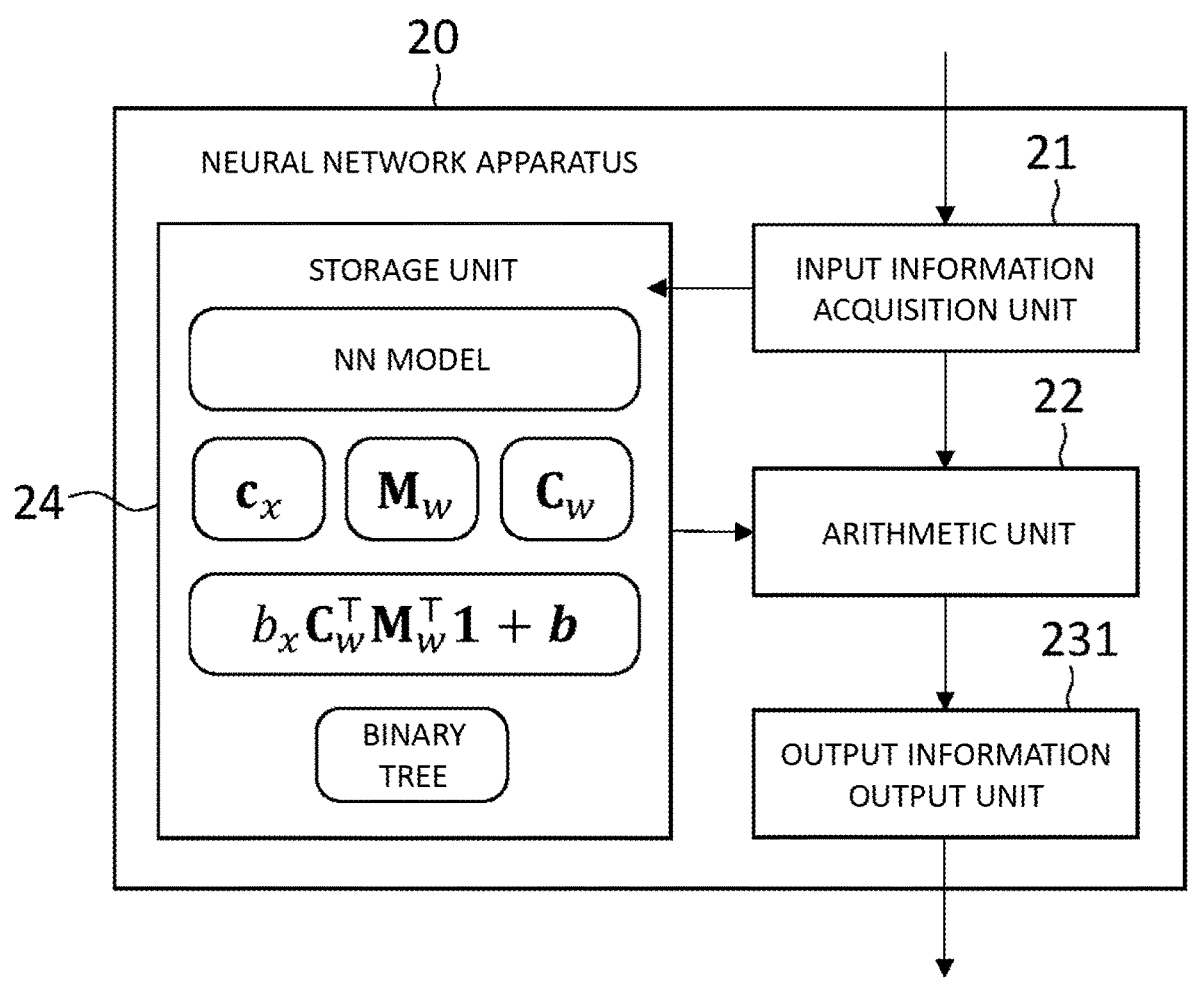
FIG. 22 illustrates a configuration of the neural network apparatus according to a modification example of the embodiment.

FIG. 22 illustrates a configuration of the neural network apparatus 20 according to the present modification example. When compared with the neural network apparatus 20 according to the above embodiment, the neural network apparatus 20 according to the present modification example has stored therein information $\beta_i$ (i=1, . . . , $2^{k_x}$) and $mp_i$ (i=1, . . . , $2^{k_x}-1$) for building a below-mentioned binary partition tree (FIG. 27) for the respective elements $x_j$ of the input vector x instead of the lookup table LUT.

Figure 23:
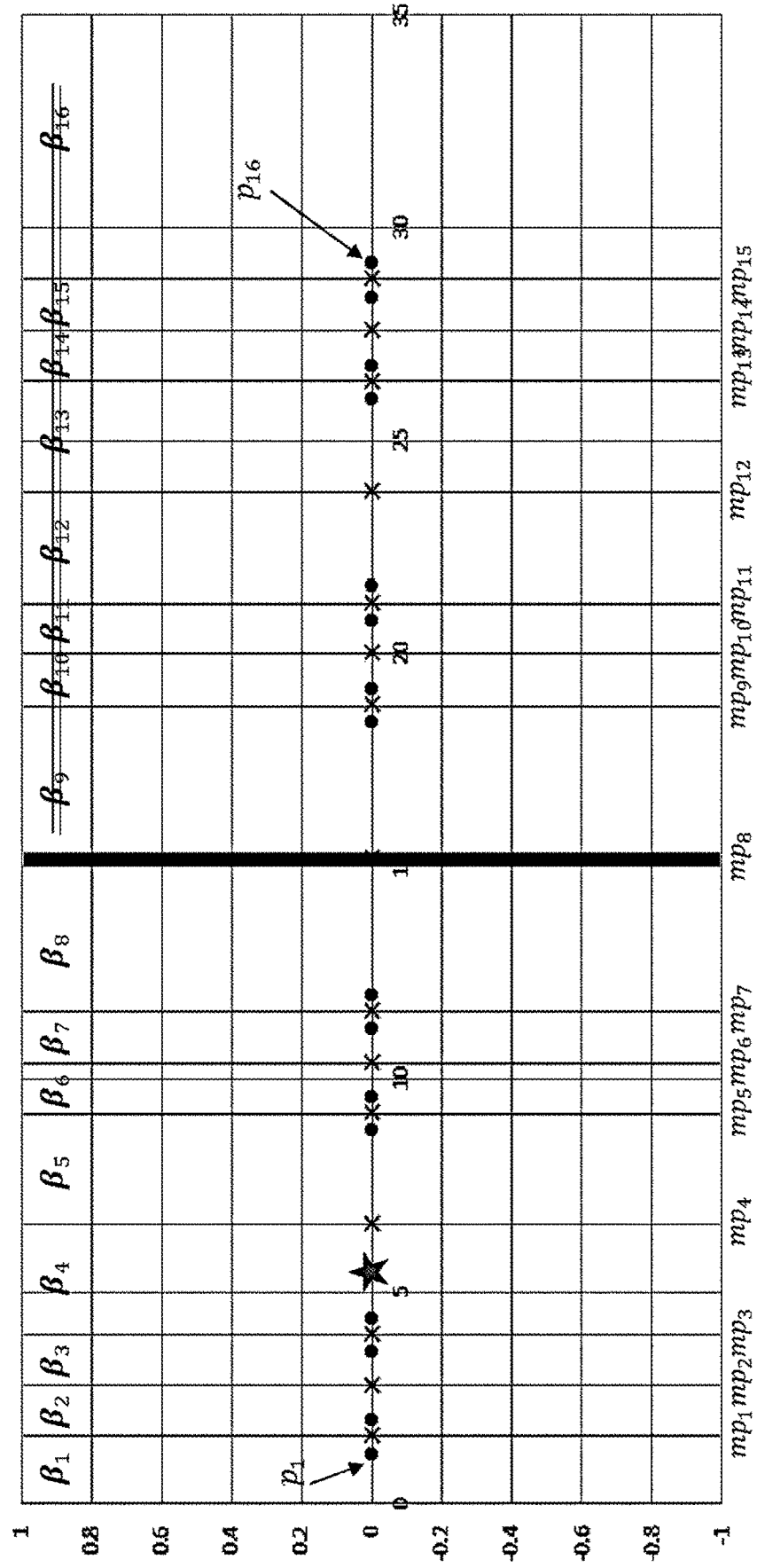
FIG. 23 describes a binary tree search according to the modification example of the embodiment.
Figure 24:
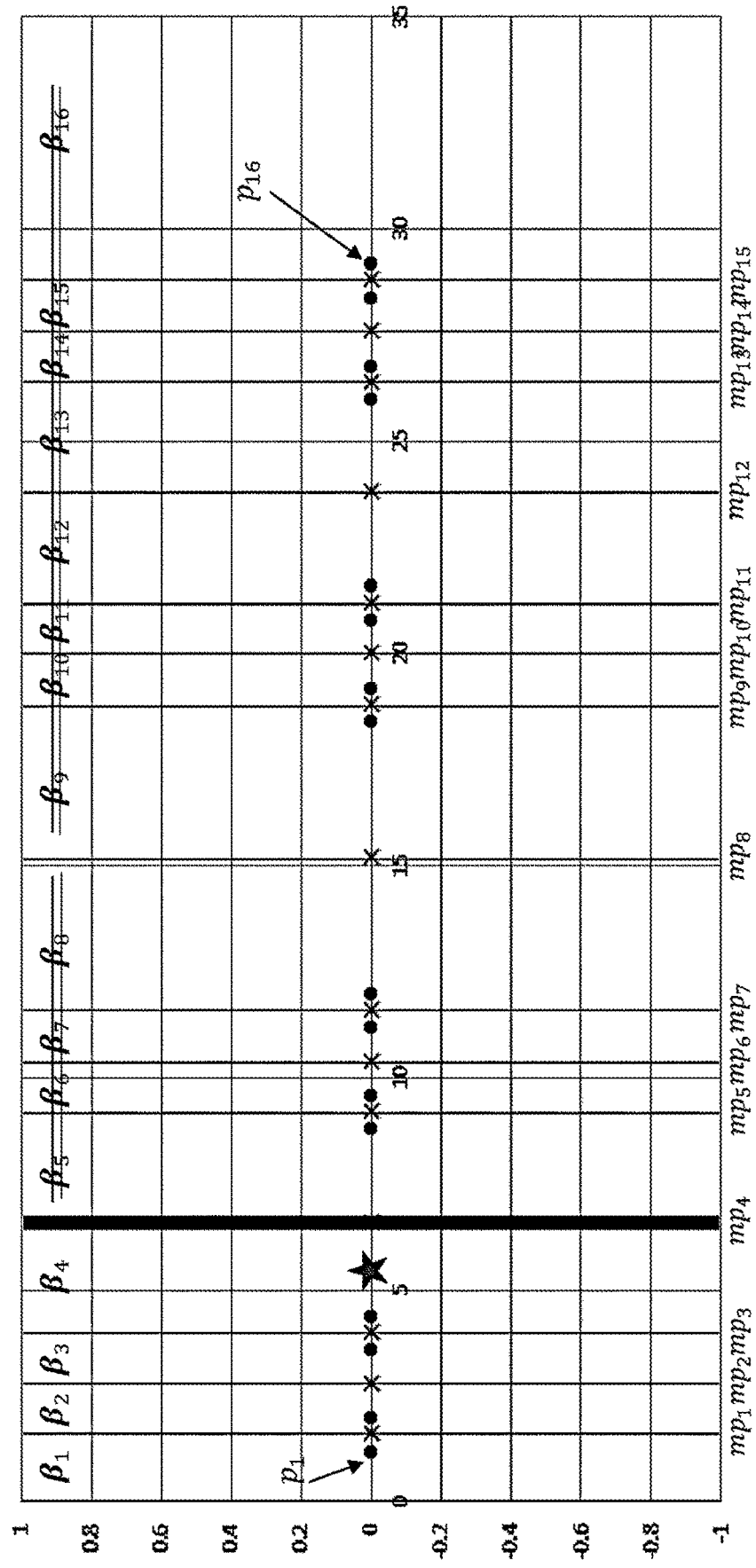
FIG. 24 describes the binary tree search according to the modification example of the embodiment.

As illustrated in FIG. 23, the arithmetic unit 22 first compares a midpoint at the center ($mp_8$ in this case) out of the midpoints $mp_i$ between the adjacent prototypes with $x_j$. In this case ($x_j=5.8$), $x_j<mp_8$ is established, and it is thus clear that the solution is one out of $\beta_1 \ldots \beta_8$. As illustrated in FIG. 24, the arithmetic unit 22 subsequently compares a midpoint $mp_i$ ($mp_4$ in this case) dividing the remaining candidates $\beta_1 \ldots \beta_8$ into two with $x_j$. In this case (x=5.8), $x_j<mp_4$ is established, and it is thus clear that the solution is one out of $\beta_1 \ldots \beta_4$.

Figure 25:
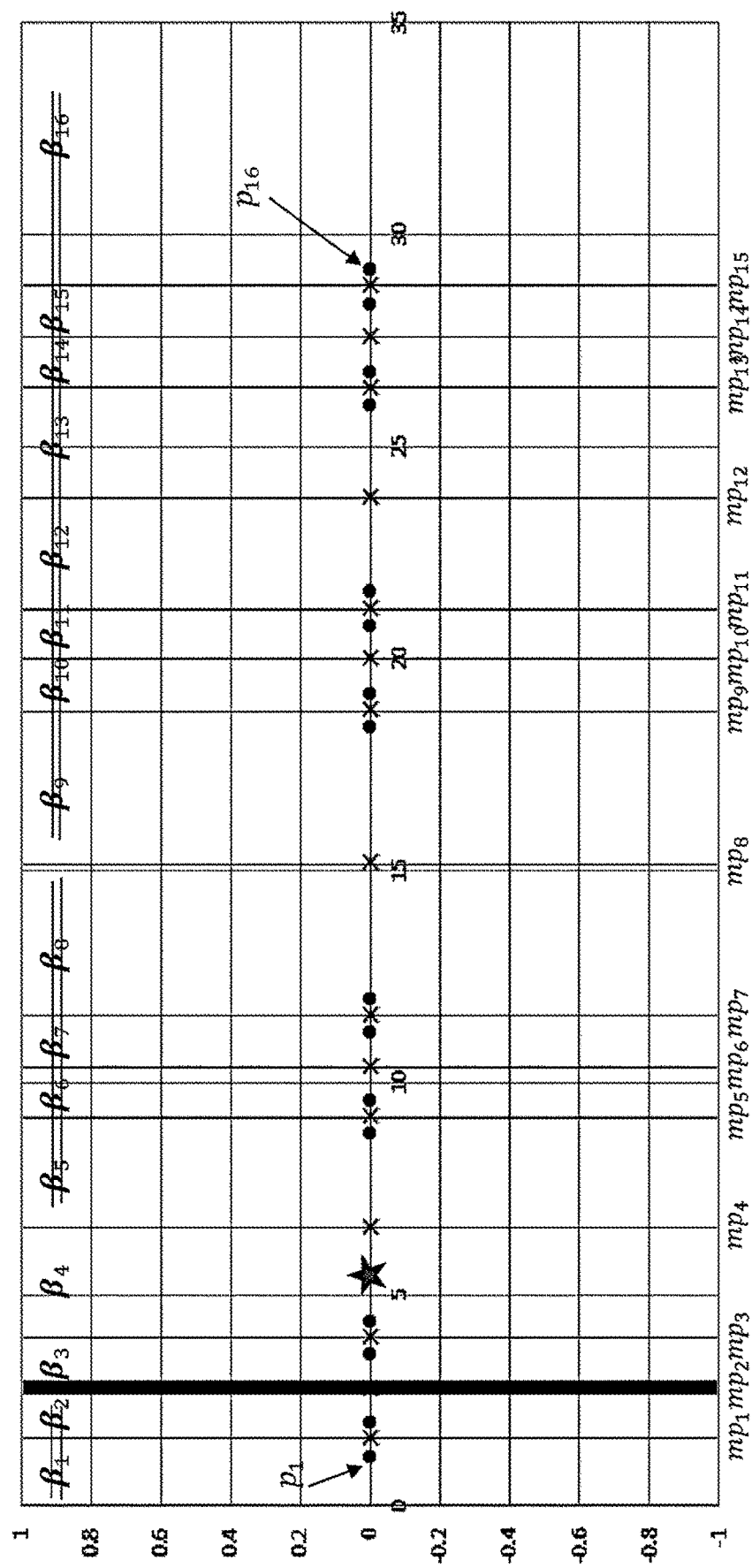
FIG. 25 describes the binary tree search according to the modification example of the embodiment.
Figure 26:
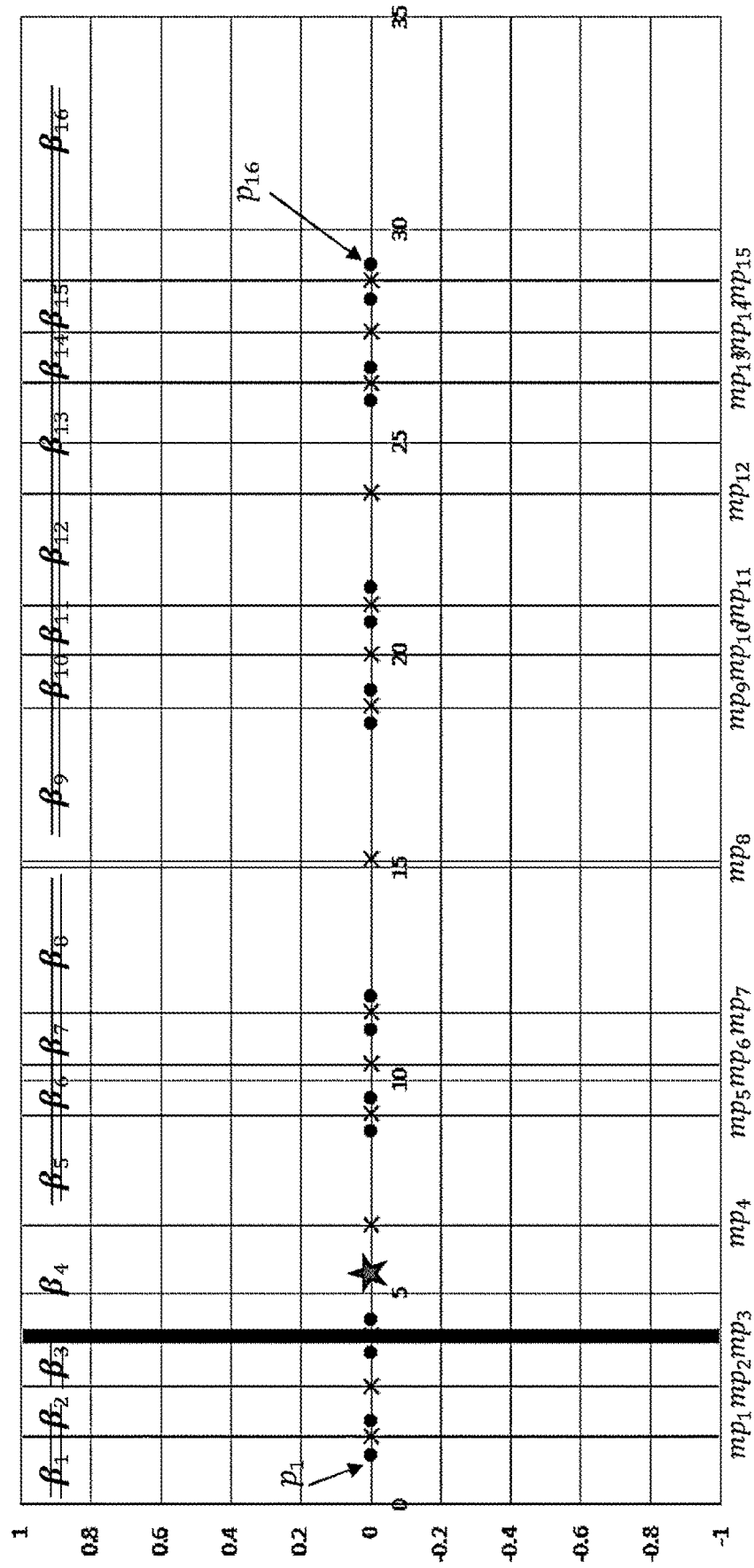
FIG. 26 describes the binary tree search according to the modification example of the embodiment.

As illustrated in FIG. 25, the arithmetic unit 22 subsequently compares a midpoint $mp_i$ ($mp_2$ in this case) dividing the remaining candidates $\beta_1 \ldots \beta_4$ into two with $x_j$. In this case ($x_j=5.8$), $x_j>mp_2$ is established, and it is thus clear that the solution is $\beta_3$ or $\beta_4$. As illustrated in FIG. 26, the arithmetic unit 22 finally compares a midpoint $mp_i$ ($mp_3$ in this case) dividing the remaining candidates $\beta_3$ and $\beta_4$ into two with $x_j$. In this case ($x_j=5.8$), $x_j>mp_3$ is established, and it is thus clear that the solution is $\beta_4$.

Figure 27:
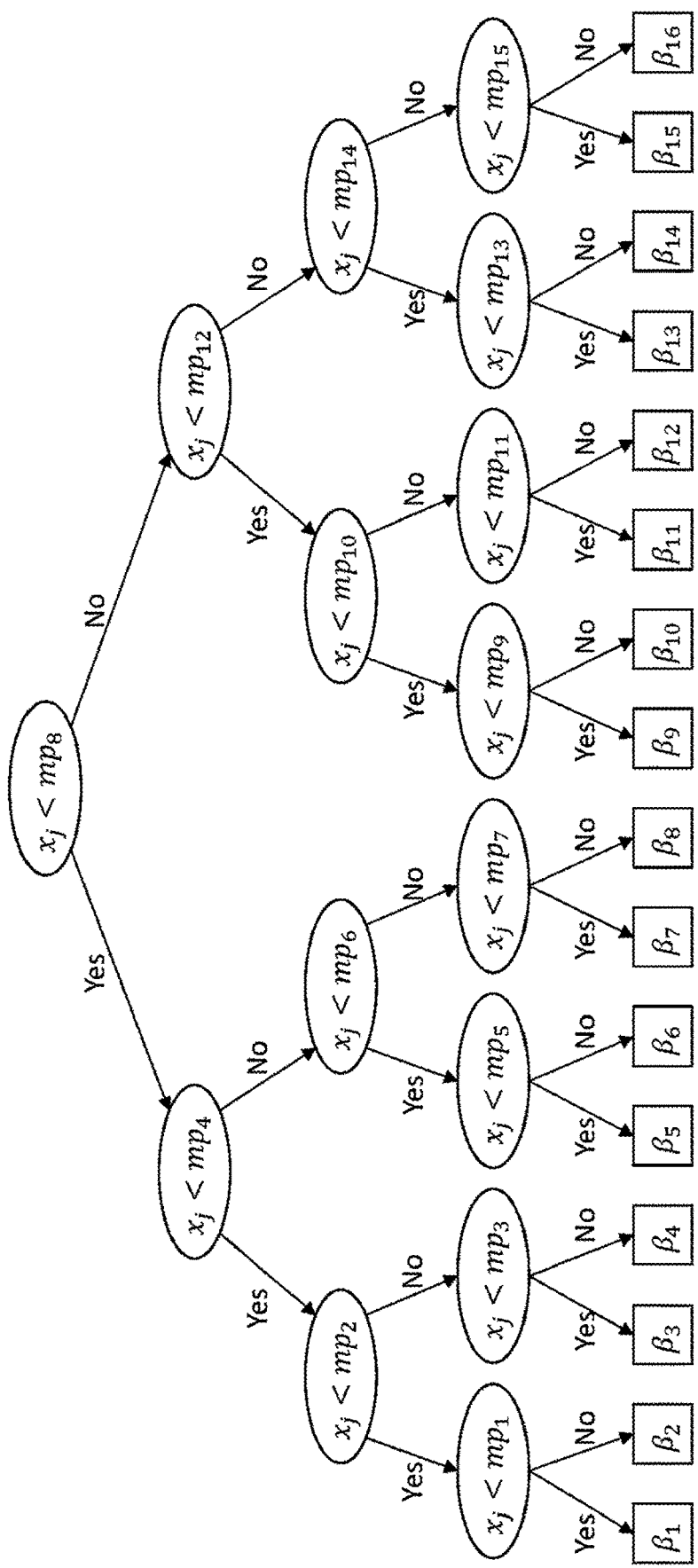
FIG. 27 describes a binary partition tree according to the modification example of the embodiment.

In the above manner, the arithmetic unit 22 can derive the solution by means of four-time comparison operation. FIG. 27 illustrates the above binary tree search method. In general, the arithmetic unit 22 can eventually derive the solution after the comparison is done as many times as the number of bits ($k_x$ times). The arithmetic unit 22 may store all of $\beta_i$ (i=1, . . . , $2^{k_x}$) and midpoints $mp_i$ (i=1, . . . , $2^{k_x}-1$) in the memory. In a case in which the input basis matrix $M_x$ is a ternary matrix, the arithmetic unit 22 may store all of $\beta_i$ (i=1, . . . , $3^{k_x}$) and midpoints $mp_i$ (i=1, . . . , $3^{k_x}-1$) in the memory.

In this manner, according to the present modification example, only $k_x$-time comparison operation can cause optimal $\beta$ to be derived at high speed, and the memory consumption amount can be reduced.

Meanwhile, in the above embodiment and modification example, although a case in which the weight matrix is a real number matrix has been described, decomposition of the weight matrix is not required in a case in which the weight matrix consists of binary or ternary elements. In this case, only the input vector may be decomposed into the sum of the product of the binary or ternary basis matrix and the coefficient vector of real numbers and the bias. Such a neural network in which the weight matrix is originally binary or ternary is introduced in M. Courbariaux, Y. Bengio, and J. P. David. BinaryConnect: Training deep neural networks with binary weights during propagations. In NIPS, pp. 3105-3113, 2015. and F. Li and B. Liu. Ternary weight networks. Technical Report arXiv: 1605.04711, 2016., for example.

By decomposing the input vector into the basis matrix and the real number vector, the operation amount can be reduced, and the operation can be performed at high speed.

Figure 28:
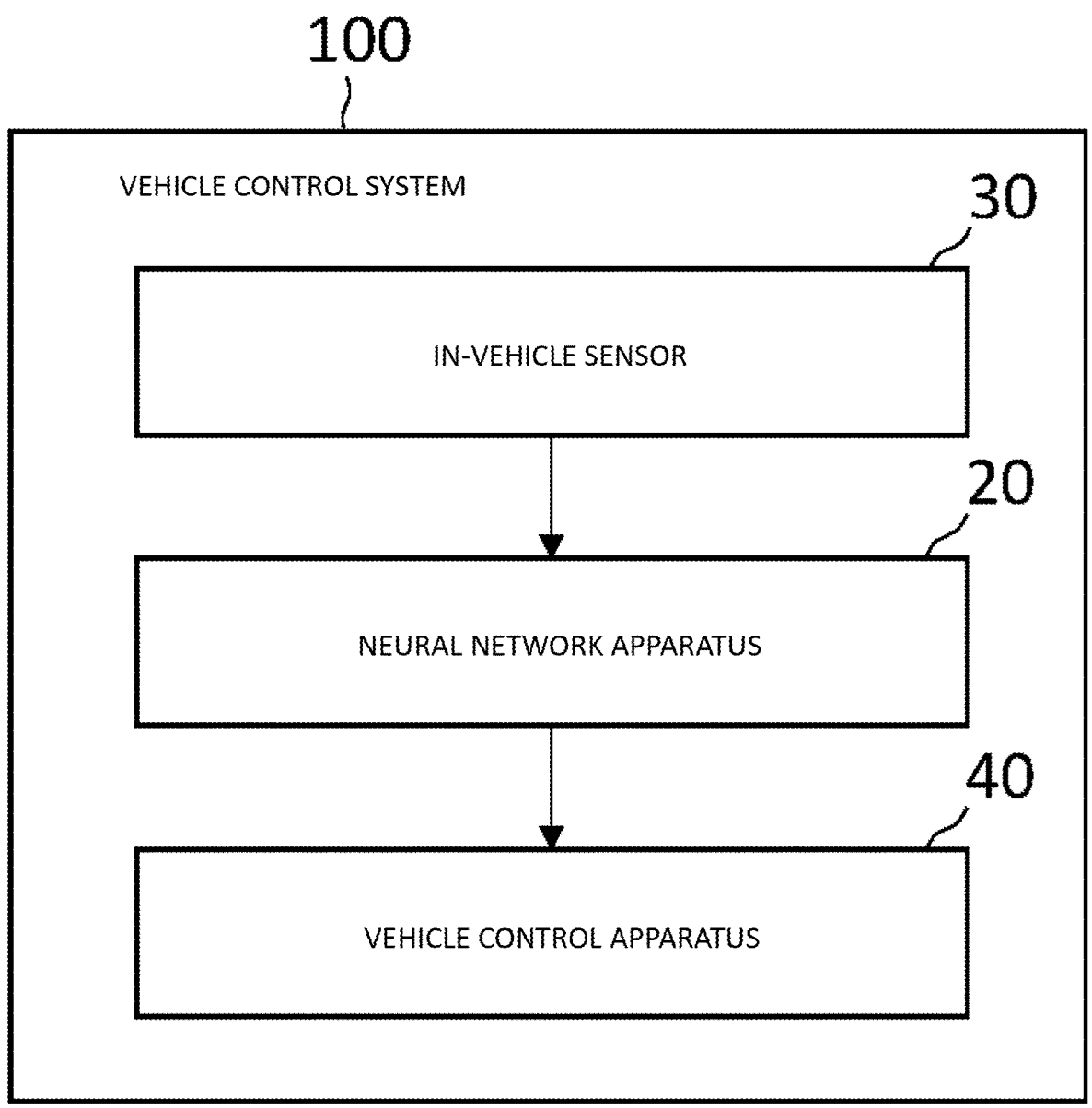
FIG. 28 illustrates a configuration of a vehicle control system according to the embodiment.

The neural network apparatus 20 according to the above embodiment and modification example can be applied in various fields such as image recognition, audio recognition, and natural language processing and can be used as an apparatus recognizing an object around a vehicle with a detection value of an in-vehicle sensor used as input information. FIG. 28 is a block diagram illustrating a configuration of a vehicle control system including the neural network apparatus 20. A vehicle control system 100 includes the neural network apparatus 20, an in-vehicle sensor 30, and a vehicle control apparatus 40.

The in-vehicle sensor 30 performs sensing to acquire input information to be input into an input unit of the neural network apparatus. Examples of the in-vehicle sensor 30 are a monocular camera, a microphone, and a millimeter-wave radar. The detection value may be input as it is into the neural network apparatus 20 as input information or may be subject to information processing to generate input information and be input into the neural network apparatus 20.

The neural network apparatus 20 may be one detecting an object of specific kind (for example, a person and a vehicle) and enclosing the object with a rectangular frame, one determining to which class each pixel belongs (semantic segmentation), or one performing other recognition processing.

The vehicle control apparatus 40 controls the vehicle based on an output (recognition result) of the neural network apparatus. The vehicle control may be automated driving of the vehicle, drive assist of the vehicle (for example, enforced braking at the time of a collision hazard, and lane keeping), or information provision to a vehicle driver (for example, provision of a recognition result, and notification of a result of hazard determination based on the recognition result).

What is claimed is:

1. A neural network apparatus comprising:
a storage unit storing a neural network model; and
an arithmetic unit inputting input information into an input layer of the neural network model and outputting an output layer,
wherein a weight matrix of at least one layer of the neural network model is constituted by a product of an integer matrix serving as a weight basis matrix and a real number matrix serving as a weight coefficient matrix,
wherein, in the at least one layer, the arithmetic unit uses an output vector from a previous layer as an input vector to decompose the input vector into a sum of a product of an integer matrix serving as an input basis matrix and a real number vector serving as an input coefficient vector and an input bias and derives a product of the input vector and the weight matrix,
wherein the weight basis matrix is a binary matrix or a ternary matrix, and the input basis matrix is a binary matrix, and
the arithmetic unit conducts product operation between the weight basis matrix and the input basis matrix with use of logical operation and bit count.

2. The neural network apparatus according to claim 1, wherein the arithmetic unit decomposes the input vector by optimizing the input basis matrix for the input vector.

3. The neural network apparatus according to claim 2, wherein, for respective elements of the input vector, the arithmetic unit optimizes the input basis matrix by selecting a nearest candidate from sums of products between all combinations of rows of the input basis matrix corresponding to the respective elements of the input vector and the input coefficient vector learned and the input bias learned.

4. The neural network apparatus according to claim 3, wherein the storage unit stores a lookup table specifying a relationship between a value of each of the respective elements of the input vector and a value of the input basis matrix in the nearest candidate for the value, and
the arithmetic unit optimizes the input basis matrix for the input vector by looking up the lookup table.

5. The neural network apparatus according to claim 3, wherein the storage unit stores, for the respective elements of the input vector, all the combinations of the rows of the input basis matrix corresponding to the respective elements of the input vector and midpoints obtained when approximate candidates of the respective elements of the input vector acquired by the combinations are arranged according to size, and
the arithmetic unit determines, for the respective elements of the input vector, the rows of the input basis matrix corresponding to the respective elements of the input vector by a binary tree search method using the midpoints to optimize the input basis matrix.

6. The neural network apparatus according to claim 1, wherein the neural network model is a convolutional neural network model,
in the convolutional neural network model, a plurality of filters of a convolutional layer are collected and are regarded as the weight matrix, the convolutional layer is regarded as a fully connected layer, and the weight matrix is constituted by a product of a weight basis matrix of integers and a weight coefficient matrix of real numbers, and
the arithmetic unit derives a product of the input vector decomposed and the weight matrix decomposed in the convolutional layer regarded as the fully connected layer.

7. The neural network apparatus according to claim 1, wherein the arithmetic unit decomposes the input vector by optimizing the input basis matrix for the input vector.

* * * * *